United States Patent
Ozaki et al.

(10) Patent No.: US 7,769,968 B2
(45) Date of Patent: **\*Aug. 3, 2010**

(54) STORAGE CONTROL SYSTEM

(75) Inventors: Satoru Ozaki, Odawara (JP); Hisao Homma, Odawara (JP); Kiichiro Urabe, Isehara (JP); Yoshihito Nakagawa, Ooi (JP); Keishi Tamura, Fujisawa (JP)

(73) Assignee: Hitachi, Ltd., Tokyo (JP)

( \* ) Notice: Subject to any disclaimer, the term of this patent is extended or adjusted under 35 U.S.C. 154(b) by 0 days.

This patent is subject to a terminal disclaimer.

(21) Appl. No.: 12/421,136

(22) Filed: Apr. 9, 2009

(65) Prior Publication Data

US 2009/0193208 A1 Jul. 30, 2009

Related U.S. Application Data

(63) Continuation of application No. 11/338,053, filed on Jan. 23, 2006, now Pat. No. 7,526,618.

(30) Foreign Application Priority Data

Nov. 14, 2005 (JP) .............................. 2005-329265

(51) Int. Cl.
G06F 13/00 (2006.01)
(52) U.S. Cl. ...................... 711/154; 711/162; 711/165
(58) Field of Classification Search ................. 711/154, 711/162, 165
See application file for complete search history.

(56) References Cited

U.S. PATENT DOCUMENTS

| | | | |
|---|---|---|---|
| 6,950,915 | B2 | 9/2005 | Ohno et al. |
| 7,114,044 | B2 | 9/2006 | Takahashi et al. |
| 7,219,227 | B2 | 5/2007 | Hori et al. |
| 2005/0060507 | A1 | 3/2005 | Kasako et al. |
| 2005/0071559 | A1 | 3/2005 | Tamura et al. |
| 2005/0114467 | A1 | 5/2005 | Ikegaya et al. |

FOREIGN PATENT DOCUMENTS

| | | |
|---|---|---|
| EP | 1283469 A2 | 2/2003 |
| EP | 1548563 A1 | 6/2005 |
| JP | 2005-107645 A | 4/2005 |
| JP | 2005-115898 A | 4/2005 |
| JP | 2005-157521 A | 6/2005 |

Primary Examiner—Mardochee Chery
(74) Attorney, Agent, or Firm—Sughrue Mion, PLLC

(57) ABSTRACT

A storage control system is provided where a first host system connected to a first storage controller can issue a control command to a second storage controller connected another host system. The first storage controller is connected to the second storage controller and the command is issued without providing the command to the other host system. The first storage controller has a virtual volume, a memory unit for storing information necessary for mapping the virtual volume to a logical device in the second storage controller, and attribute information for the logical device. The host system identifies the virtual volume as the logical device in the second storage controller and issues a control command to this logical device via the virtual volume.

11 Claims, 22 Drawing Sheets

FIG.5

VOLUME INFORMATION TABLE   400

| LOGICAL VOLUME NUMBER | STATE OF VOLUME | FORMAT | CAPACITY | PAIR NUMBER | PHYSICAL ADDRESS | |
|---|---|---|---|---|---|---|
| | | | | | STORAGE SYSTEM NUMBER | POSITION FROM FRONT |
| 1 | PRIMARY | OPEN3 | 6 | 1 | 1 | 0 |
| 2 | SECONDARY | OPEN3 | 6 | 1 | 2 | 3 |
| 3 | NORMAL | OPEN3 | 3 | - | 2 | 9 |
| 4 | NORMAL | OPEN3 | 3 | - | 3 | 0 |
| 5 | NORMAL | OPEN3 | 6 | - | 3 | 9 |
| 6 | UNUSED | OPEN6 | 6 | - | 1 | 12 |

FIG.6

PAIR SETTING INFORMATION TABLE   500

| PAIR NUMBER | PAIR STATUS | PRIMARY LOGICAL VOLUME NUMBER | SECONDARY LOGICAL VOLUME NUMBER | VIRTUALIZATION |
|---|---|---|---|---|
| 1 | NORMAL | 1 | 2 | ON |
| 2 | NORMAL | 2 | 5 | |
| 3 | UNUSED | 0 | 0 | |
| 4 | UNUSED | 0 | 0 | |
| 5 | UNUSED | 0 | 0 | |

FIG.7

JOURNAL GROUP SETTING INFORMATION TABLE   600

| JOURNAL GROUP NUMBER | PAIR STATUS | SOURCE VOLUME NUMBER | JOURNAL VOLUME NUMBER |
|---|---|---|---|
| 1 | NORMAL | 2(Data1) | 3(JNL1) |
| 2 | NORMAL | 5(Data2) | 4(JNL2) |

| LUN | DEVICE | COMMAND DEVICE LUN |
|---|---|---|
| 0 | SECOND | 0 |
| 1 | THIRD | 1 |
| ⋮ | ⋮ | ⋮ |

| LUN | ATTRIBUTE INFORMATION FOR COMMAND DEVICE | BIT INFORMATION |
|---|---|---|
| 0 | * * * * | * * * |
| ⋮ | ⋮ | ⋮ |

| LU# | SERIAL NUMBER |
|---|---|
| 0 | Serial Number A |
| 1 | Serial Number B |
| 2 | Serial Number C |
| 3 | Serial Number A |

STORAGE CONTROL SYSTEM

CROSS REFERENCES TO RELATED APPLICATIONS

This is a continuation of application Ser. No. 11/338,053 filed Jan. 23, 2006. The entire disclosure(s) of the prior application(s), application Ser. No. 11/338,053 now U.S. Pat. No. 7,526,618 is considered part of the disclosure of the accompanying continuation application and is hereby incorporated by reference.

This application relates to and claims the benefit of priority from Japanese Patent Application No. 2005-329265, filed on Nov. 14, 2005 the entire disclosure of which is incorporated herein by reference.

FIELD OF THE INVENTION

The present invention generally relates to storage technology and, in particular, to a storage control system having a storage controller connected to another storage controller.

DESCRIPTION OF RELATED ART

One of the well known storage control systems of the above type is a system having a function for replicating volumes between storage controllers (storage apparatuses). It is called a remote copy system. In this system, a storage controller is provided at a site away from another storage controller and a replica of data in one storage controller is stored in the other storage controller.

An example of a conventional remote copy system is described in Japanese Patent Laid-Open (Kokai) Publication No. 2005-157521. In the system, in order to obtain remote copy status information in a distant storage sub system that is not directly connected to a host computer, each storage sub system has: means for receiving a obtain status information command from a host computer; means for analyzing the command and determining whether the self-storage sub system is a target; means for transmitting the command to a lower level storage sub system connected thereto if the self-storage sub system is not a target; and means for transmitting status information to an upper level storage sub system connected thereto when it receives status information from a lower storage sub system.

The remote copy system has a structure where a storage controller at a specified site is connected to a storage controller at a remote site via a communication means. The connection between storage controllers is described in, for example, Japanese Patent Laid-Open (Kokai) Publication No. 2005-107645. The Publication describes a storage controller that can effectively use its storage resources by virtualizing external storage resources as its internal storage resources.

Another example of that type of remote copy system is a system where a storage controller at a specified site is connected to a storage controller at a remote site via a storage controller at a midway site. In this system, a copy pair relationship is established between a logical volume in the storage controller at the midway site and a logical volume in the storage controller at the remote site; and a logical volume in the storage controller at the specified site is synchronously copied to the logical volume in the storage controller at the remote site. The logical volume in the storage controller at the midway site is asynchronously copied to the logical volume in the storage controller at the remote site.

In that type of remote copy system, a storage controller has a command device for processing control commands from host computers. A command device is a dedicated logical device (or a logical volume) whereby a storage controller receives control commands from host computers. A host computer writes a control command as data in a command device in a storage controller and the storage controller processes the control command stored in its own command device. Japanese Patent Laid-Open (Kokai) Publication No. 2005-115898 describes a technique for virtualizing a command device of a remote-site storage controller in a specified storage controller.

SUMMARY OF THE INVENTION

The inventive methodology is directed to methods and systems that substantially obviate one or more of the above and other problems associated with conventional storage systems.

Specifically, in order to have storage controllers at a midway site and a remote site execute control commands, such as commands requesting logical volume pair setting, from a host computer connected to a specified storage controller at a main site, it is necessary to provide the host computers in those sites and a network for transmitting control commands between the host computers, too. However, when a failure occurs in the communication therebetween, control commands cannot be issued from the main-site host computer to the host computers at the other sites.

An embodiment of the present invention aims to provide a storage control system where a host system connected to a specified storage controller can issue a control command to be executed by another storage controller connected to the specified storage controller, to the other storage controller without requiring a host system for that other storage controller. It also aims to provide a storage control system where a host system is also provided to a storage controller connected a specified storage controller, and even if a failure occurs in the communication between the first host system connected to the specified storage controller and the second host system, connected to the other storage controller, a control command still can be issued from the first host system to the other storage controller.

In order to achieve the above goal, the storage control system according to an embodiment of the present invention is characterized in that a specified storage controller has a virtual volume, which is mapped onto a command device in another storage controller connected to the specified storage controller, and a host system connected to the specified storage controller identifies the virtual volume as the command device in which a control command to be processed by the other storage controller is set. When the host computer issues a control command to the virtual volume, the control command is transmitted to the command device without involving a connection path between the host system and a host system connected to the other storage controller.

An aspect of the invention provides a storage control system including:

a host system; a first storage controller connected to the host system to enable communication; and a second storage controller connected to the first storage controller to enable communication, the second storage controller having a logical device where a control command is written, and being configured to execute the control command. In the storage control system, the first storage controller includes: a virtual volume; and a memory unit for storing information necessary when mapping the virtual volume to the logical device and attribute information for the logical device. The host system identifies its virtual volume as the logical device in the second storage controller and issues a control command via the virtual volume to the logical device.

Another aspect of the invention provides a storage control system including: a first storage controller; a first host system connected to the first storage controller; a second storage controller connected to the first storage controller; and a second host system connected to the second storage controller. In the storage control system, the second storage controller has a logical device where a control command is written and is configured to execute the control command, the first storage controller has a virtual volume mapped onto the logical device, and the first host system identifies the virtual volume as the logical device in the second storage controller and can issue a control command to the logical device via the virtual volume.

Still another aspect of the invention provides a storage control method for a storage control system where a plurality of storage controllers are connected to each other. The method includes: a step where a host system connected to one of the storage controllers recognizes a logical device in another storage controller connected to the storage controller; a step where the host system issues a control command to be executed by the other storage controller, to a virtual volume in the storage controller, the virtual volume being mapped onto the logical device; a step where the control command is transmitted from the virtual volume to the logical device; and a step where the other storage controller executes the control command in its logical device.

Yet another aspect of the invention provides a storage control system having: a host system; a first storage site connected to the host system to enable communication; and a second storage site connected to the first storage site to enable communication. In the storage control system, the second storage site has a logical device where a control command from the host system is written and is configured to execute the control command; the first storage site has a virtual volume mapped onto the logical device; and the host system identifies the virtual volume in the first storage site as the logical device in the second storage site and indicates to a user that the logical device belongs to the second storage site.

As explained above, according to an embodiment of the present invention, a host system connected to a specified storage controller can issue a control command to another storage controller, the command having content to be executed by the other storage controller, without requiring a connection path between the host system connected to the specified storage controller and a host system connected to the other storage controller.

BRIEF DESCRIPTION OF THE DRAWINGS

FIG. 5 shows a volume information table.

FIG. 6 shows a pair setting information table.

FIG. 7 shows a journal group setting information table.

DETAILED DESCRIPTION OF THE INVENTION

Figure 1:
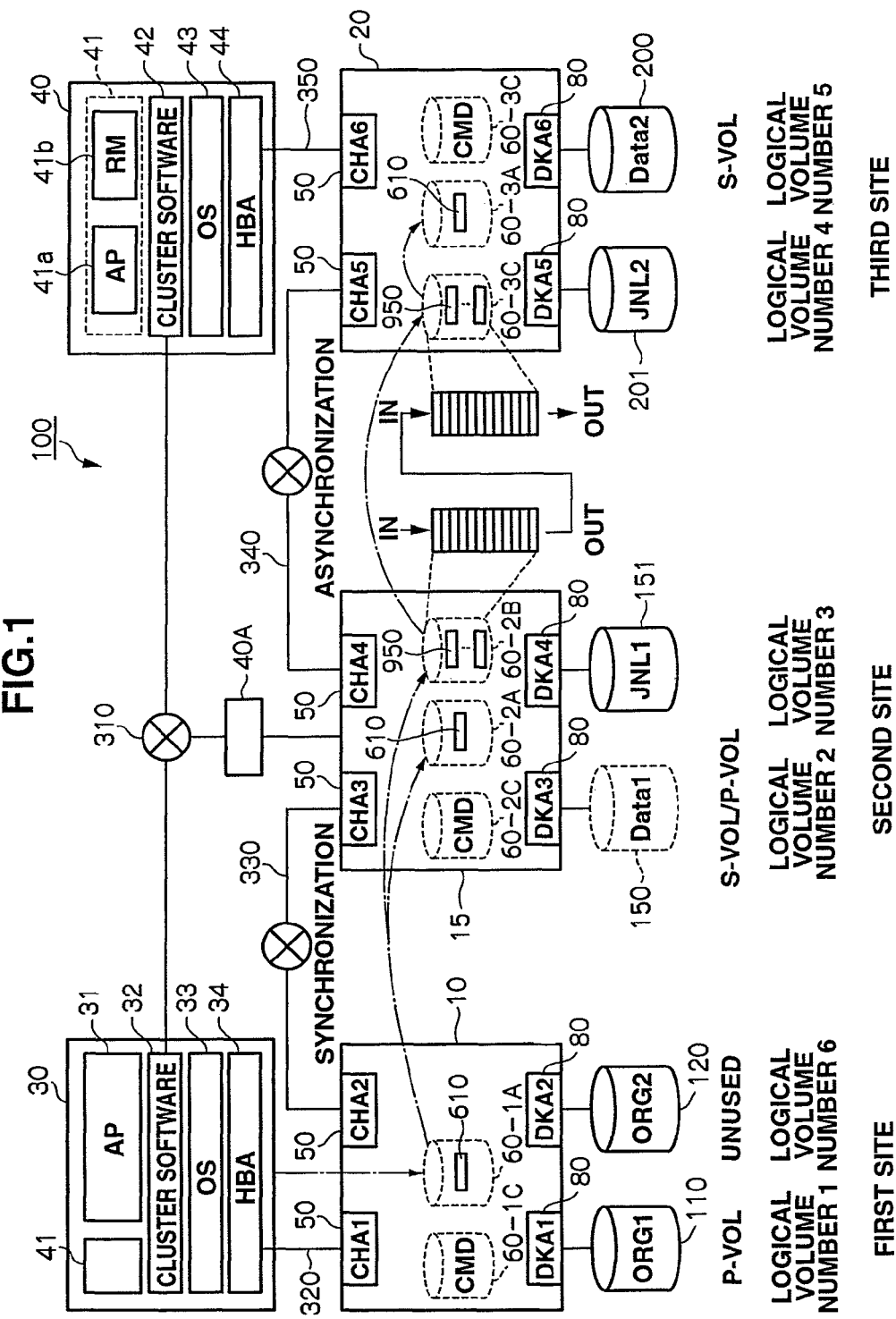
FIG. 1 shows the structure of a remote copy system according to Embodiment 1 of the present invention.

Embodiments of the present invention is described below with reference to the attached drawings. The embodiments are merely examples of the present invention and do not limit the scope of the present invention. The aforesaid embodiment also can be modified or improved, thus the present invention includes equivalents thereof. FIG. 1 shows an exemplary structure of a remote copy system 100. The remote copy system includes a first storage system (storage controller) 10 located at a first site (alternatively called the "primary site" or "main site"); a second storage system 15 located at a second site ("secondary site" or "local site"); and a third storage system 20 located at a third site ("remote site"). Each storage system is configured with a storage controller.

The second site is located at a short distance or a middle distance away from the first site while the third site is located at a long distance away from the first site. The first storage system 10 with a host computer (a first host computer system) 30 connected realizes an active (operational) operational data processing system. The third storage system 20 with a host computer (a second host computer system) 40 connected realizes an alternate (standby) data processing system. These data processing systems form a cluster, and when the active data processing system has trouble, the alternate data processing system performs failover.

The host computer 30 has a host bus adapter 34 and is connected to a channel adapter (CHA1) 50 in the first storage system 10 via a communication line 320. It also has an operating system 33, cluster software 32, and application program 31 loaded therein. The cluster software 32 is for checking whether the application program 31 is operating normally.

The host computer 40 has a host bus adapter 44 and is connected to a channel adapter (CHA6) 50 in the third storage system 20 via a communication line 350. It also has an operating system 43, cluster software 42, and resource group 41 loaded therein. The resource group 41 includes an application program 41a and storage system management software (RAID manager) 41b.

The resource group 41 is also included into the host computer 30. The storage system management software 41b controls storage systems, the control including the setting and deletion of logical volume pairs as well as references for pair statuses.

The host computers 30 and 40 are connected to each other via a communication line 310. When a failure occurs in the host computer 30 and prevents normal operation of the application program 31, the cluster software 32 detects the occurrence of the failure and transmits an activation command to the alternate host computer 40. Consequently, failover from the active data processing system to the alternate data processing system can be performed. The application programs 31 and 41a include programs for controlling various operations such as deposit/saving management at banks.

Figure 2:
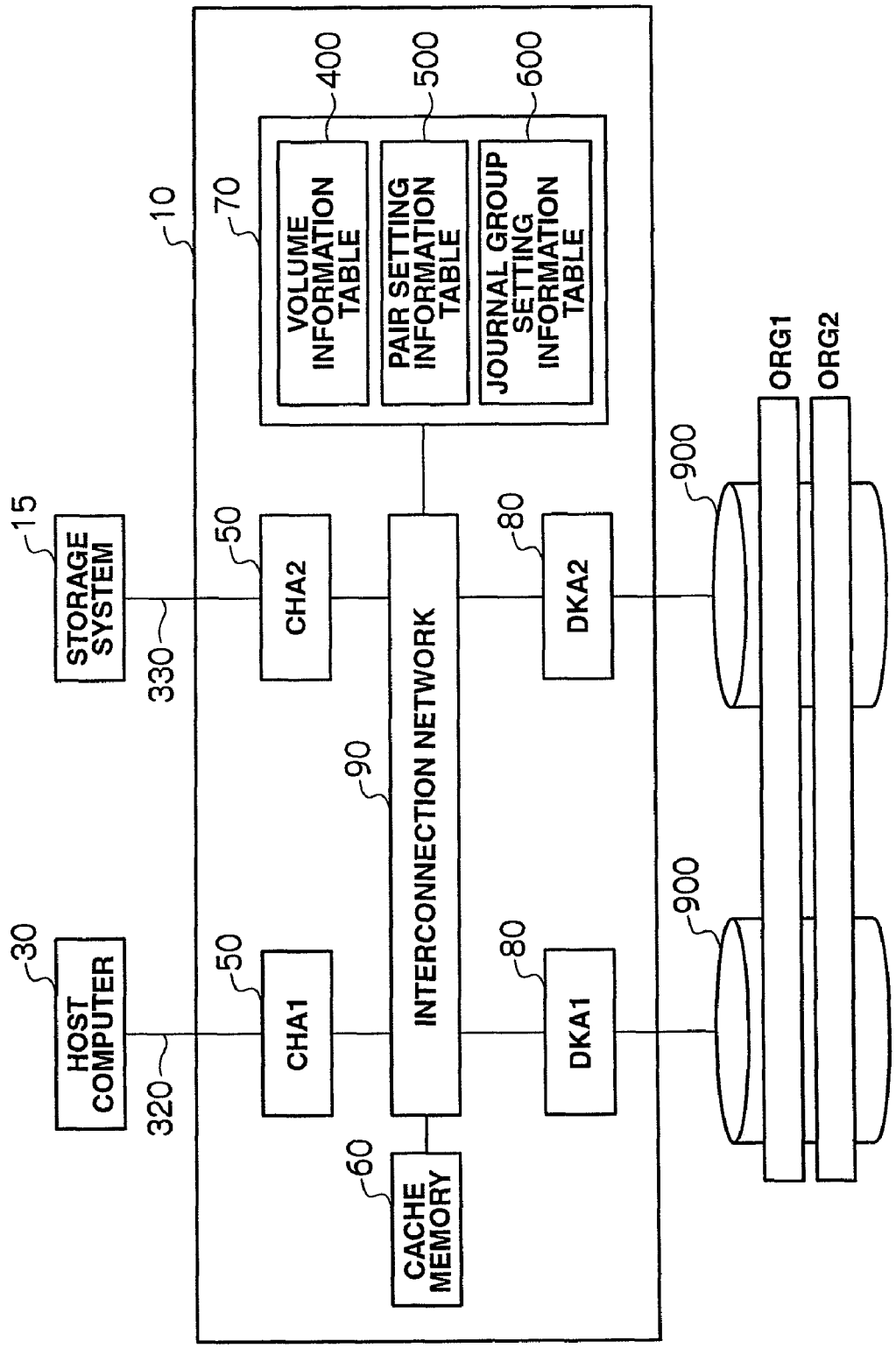
FIG. 2 shows the structure of a first storage system.

The exemplary structure of the first storage system 10 is explained with reference to FIGS. 1 and 2. The first storage system 10 has channel adapters 50, cache memory 60, shared memory 70, disk adapters 80, interconnection network 90, and physical volumes 900. The channel adapters 50 are interfaces for receiving input and output requests from the host computer 30. The cache memory 60 and the shared memory 70 are used by the channel adapters 50 and the disk adapters 80. The shared memory 70 is mainly used for storing control information and commands, for example, a volume information table 400, a pair setting information table 500, and a journal group setting information table 600. The cache memory 60 is used for temporarily storing data.

When a data input/output command received by the channel adapter 50 from the host computer 30 is, for example, a write command, the channel adapter 50 writes it in the shared memory 70 and writes write data received from the host computer 30 in the cache memory 60. The disk adapters 80 monitor the shared memory 70 and when they detect that a write command has been written in the shared memory 70, the relevant disk adapter 80 reads the write data from the cache memory 60 and writes it in a physical volume 900 in accordance with the write command.

When a data input/output command received by the channel adapter 50 from the host computer 30 is a read command, the channel adapter 50 writes it in the shared memory 70 and checks whether the read target data exists in the cache memory 60. If the data exists in the cache memory 60, the channel adapter 50 reads the data from the cache memory 60 and transmits it to the host computer 30. On the other hand, if the target data does not exist in the cache memory 60, the relevant disk adapter 80, having detected that the read command has been written in the shared memory 70, reads the read target data from the relevant physical volume 900, writes it into the cache memory 60, and writes the appropriate indication into the shared memory 70. The channel adapters 50 monitor the shared memory 70 and when they detect that the read target data has been written in the cache memory 60, the relevant channel adapter 50 reads it from the cache memory 60 and transmits it to the host computer 30.

The disk adapters 80 convert logical address-specified data access requests sent from the channel adapters 50 into physical address-specified data access requests and write and read data to and from the physical volumes 900. If the physical volumes 900 are structured according to RAID, the disk adapters 80 access data according to RAID. The disk adapters 80 also perform replication controls and remote copy controls for the purposes of data replication management, backup control, and data loss prevention upon disaster (disaster recovery).

The interconnection network 90 connects the channel adapters 50, cache memory 60, shared memory 70, and disk adapters 80 to one another. It is structured with, for example, a high-speed bus such as an ultrahigh-speed crossbar switch that transmits data by high-speed switching. This structure can dramatically enhance communication performance between the channel adapters 50 and enables a high-speed file share function and high-speed failover. Note that the cache memory 60 and the shared memory 70 may be structured with different storage resources or, alternatively, a part of the storage area of the cache memory 60 may be assigned as the shared memory 70.

The first storage system 10 has one or more physical volumes 900 and provides storage areas accessed by the host computer 30. A logical volume (ORG1) 110 and a logical volume (ORG2) 120 are set in the storage areas provided by one or more physical volumes 900. Hard disk devices and flexible disk devices can be used as the physical volumes 900. The physical volumes 900 may form RAID disk arrays consisting of a plurality of disk drives. The first storage system 10 and the physical volumes 900 may be directly connected to each other or interconnected via a network. Alternatively, the physical volumes 900 may be integrated in the first storage system 10.

In the following explanation, it is assumed that the logical volume (ORG1) 110 stores the original data, which is the replication source. To distinguish replication source data from replicated data, a logical volume storing replication source data is called the "primary logical volume (P-VOL)" and a logical volume storing replicated data is called the "sub logical volume (S-VOL). One primary logical volume and one sub logical volume constitute a pair.

Figure 3:
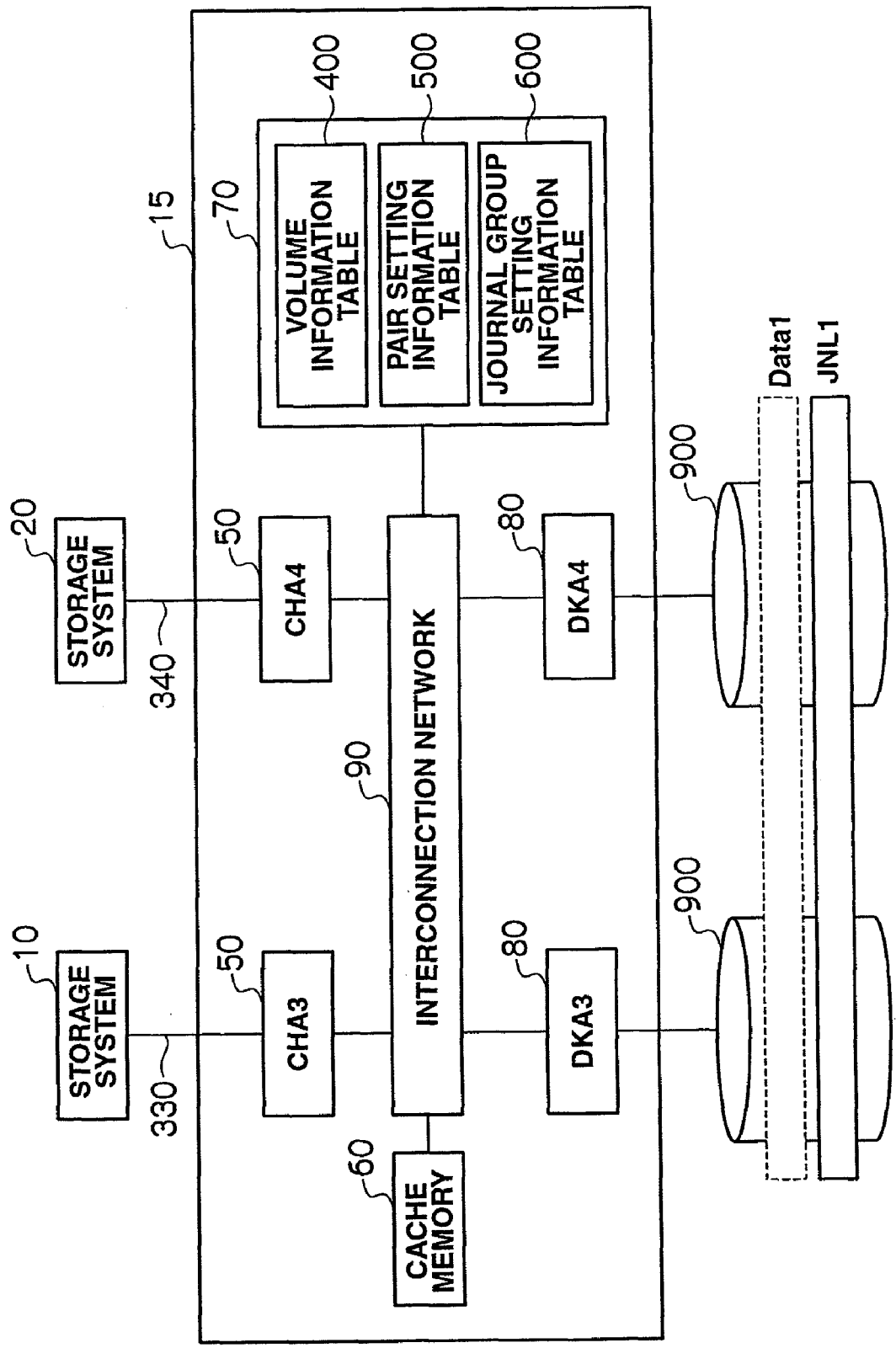
FIG. 3 shows the structure of a second storage system.

An exemplary structure of the second storage system 15 is explained below with reference to FIGS. 1 and 3. In FIG. 3, components having the same reference numerals as in FIG. 2 indicate the same components as in FIG. 2. Therefore, their detailed explanations are omitted. The second storage system 15 has one or more physical volumes 900. A logical volume (Data 1) 150 and a logical volume (JNL1) 151 are set in the storage areas provided by the one or more physical volumes 900. The logical volume (Data 1) 150 is a virtual volume, which is virtually set in the second storage system 15 in order for the first storage system 10 to specify a storage area in the second storage system 15. The logical volume (Data 1) 150 stores data replicated from the data in the logical volume (ORG1) 110. That is, the logical volume (ORG1) 110 and the logical volume (Data 1) 150 have a primary logical volume/sub logical volume relationship.

Figure 4:
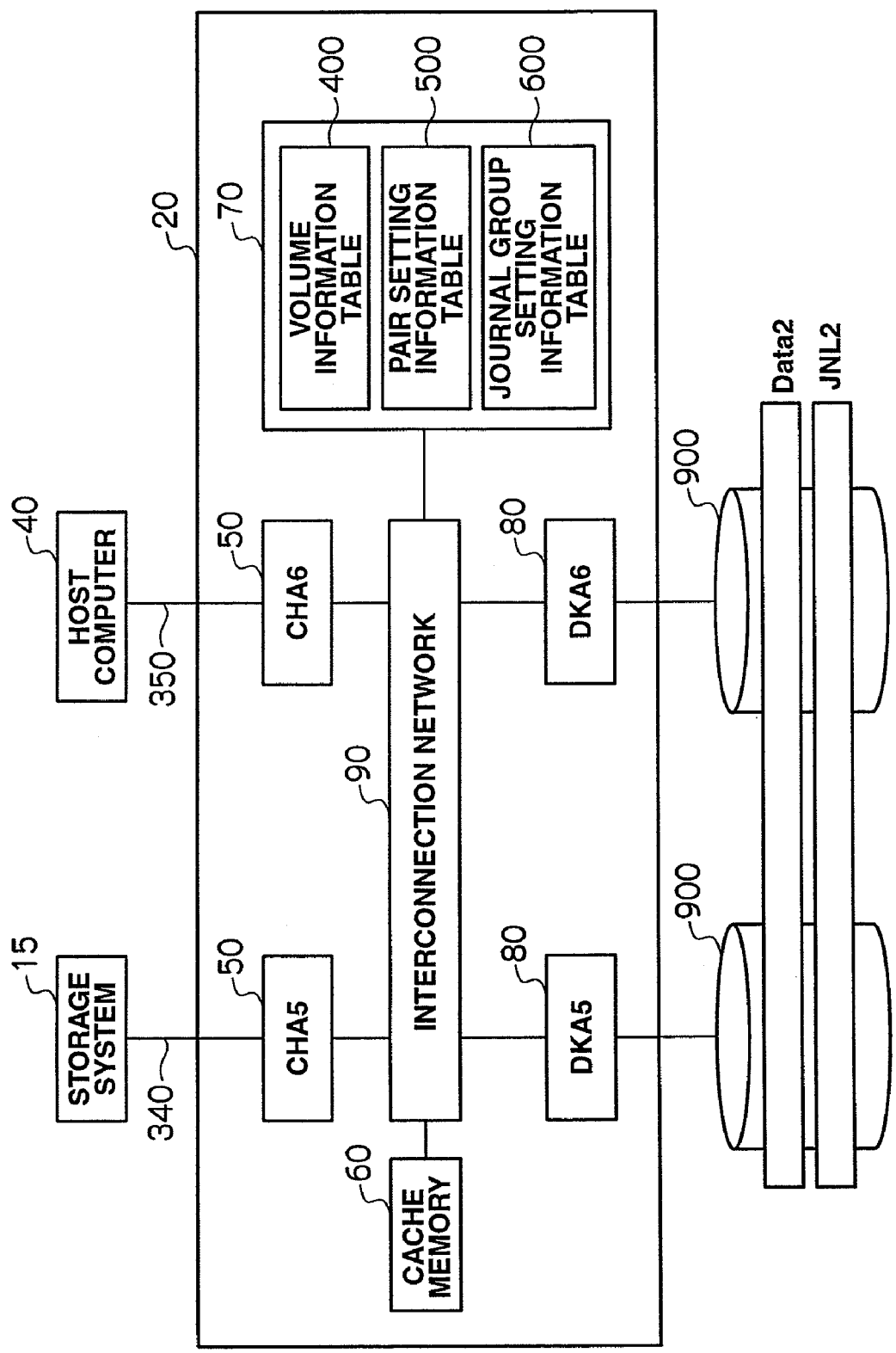
FIG. 4 shows the structure of a third storage system.

An exemplary structure of the third storage system 20 is explained with reference to FIGS. 1 and 4. In FIG. 4, components having the same reference numerals as in FIG. 2 indicate the same components as in FIG. 2. Thus, their detailed explanations are omitted. The third storage system 30 also has one or more physical volumes 900. A logical volume (Data 2) 200 and a logical volume (JNL2) 201 are set in the storage areas provided by the one or more physical volumes 900. The logical volume (Data 2) 200 stores data replicated from the data in the logical volume (Data 1) 150.

That is, the logical volume (Data 1) 150 and the logical volume (data 2) 200 have a primary logical volume/sub logical volume relationship.

FIG. 5 illustrates an exemplary volume information table 400. The volume information table 400 defines: the physical addresses of logical volumes set for the physical volumes 900; attribute information such as the capacities and formats of the logical volumes: and pair information etc. For ease of explanation, the logical volume number of each logical volume is unique in the remote copy system 100 however; alternatively, a logical volume number can be uniquely defined in each storage system and have a storage system identifier attached.

In the volume information table 400, logical volume number 1 indicates the logical volume (ORG1) 110; logical volume number 2 indicates the logical volume (Data 1) 150; logical volume number 3 indicates the logical volume (JNL1) 151; logical volume number 4 indicates the logical volume (JNL2) 201; logical volume number 5 indicates the logical volume (Data 2) 200; and logical volume number 6 indicates the logical volume (ORG2) 120. The logical volume (ORG1) 110 and the logical volume (Data 1) 150 are defined as a pair with a pair number 1. The logical volume (ORG2) 120 is defined as an unused logical volume.

In the volume information table 400, the word (Japanese word) 'sei (正)' entered in a volume status field means that the relevant logical volume is in the state where it can operate as a primary logical volume, and the word 'fuku (副)' means that the relevant logical volume is in the state where it can operate as a sub logical volume. The word 'seijo (正常)' means that the relevant logical volume is in a state where it is not paired with another logical volume but can operate normally. Based on the physical addresses defined in the table 400, the disk adapters 80 control the writing of data read from the cache memory 60 to the physical volumes 900 and the writing of data read from the physical volumes 900 to the cache memory 60.

FIG. 6 shows a pair setting information table 500. In the table, a pair relationship identified by pair number 1 is defined for the logical volume (ORG1) 110 and the logical volume (Data 1) 150. Another pair relationship identified by pair number 2 is defined for the logical volume (Data 1) 150 and the logical volume (Data 2) 200. The word 'ON' entered in a virtualization field means that, in the relevant pair of logical volumes, the sub logical volume is a virtual volume. Once a pair relationship is established, write processing performed for the primary logical volume triggers various processing for the sub logical volume in accordance with the status of the pair. Examples of the statuses include: 'paired'; 'suspended'; and 'initial copy' etc. When a pair is in the 'paired' status, data written in the primary logical volume is written in the sub logical volume. When a pair is in the 'suspended' status, data written in the primary logical volume is not reflected in the sub logical volume, but a difference information bit map is created, which indicates what data update has been performed for the primary logical volume because a reference time when the two logical volumes were synchronized with each other.

Journal data is explained below. For ease of explanation, a logical volume with data that is to be updated is called the "source logical volume" and a logical volume storing a copy of the source logical volume is called the "copy logical volume." Journal data includes at least: updated data in a source logical volume; and update information indicating the position in the data in the source logical volume where the update has been performed (for example, a logical address in the source logical volume). With journal data, the source logical volume can be recreated even when its data has been updated.

In other words, based on the premise that a source logical volume and a copy logical volume are synchronized with each other at a certain point in time and that their data images are identical, if a piece of journal data is stored each time data in the source logical volume is updated thereafter, data images of the source logical volume can be reproduced in a copy logical volume using the pieces of journal data. With journal data, the data images of the source logical volume can be recreated in the copy logical volume without requiring the same volume as the source logical volume. A logical volume storing journal data is called the "journal logical volume." The aforementioned logical volume (JNL1) 151 and the logical volume (JNL2) 201 are journal logical volumes.

FIG. 7 shows a journal group setting information table 600. A journal group refers to a pair of logical volumes. A journal group is a pair of logical volumes—a logical volume; and a journal logical volume that stores, when the logical volume is updated, the relevant write command by dividing it into update information (such as a write destination address) 620 and write data 610. In the example shown in the table 600, the logical volume (Data 1) 150 and the logical volume (JNL1) 151 belong to a journal group identified by journal group number 1 and the logical volume (Data 2) 200 and the logical volume (JNL2) 201 belong to a journal group identified by journal group number 2. Note that a journal group may be alternatively called a "journal pair."

Figure 8:
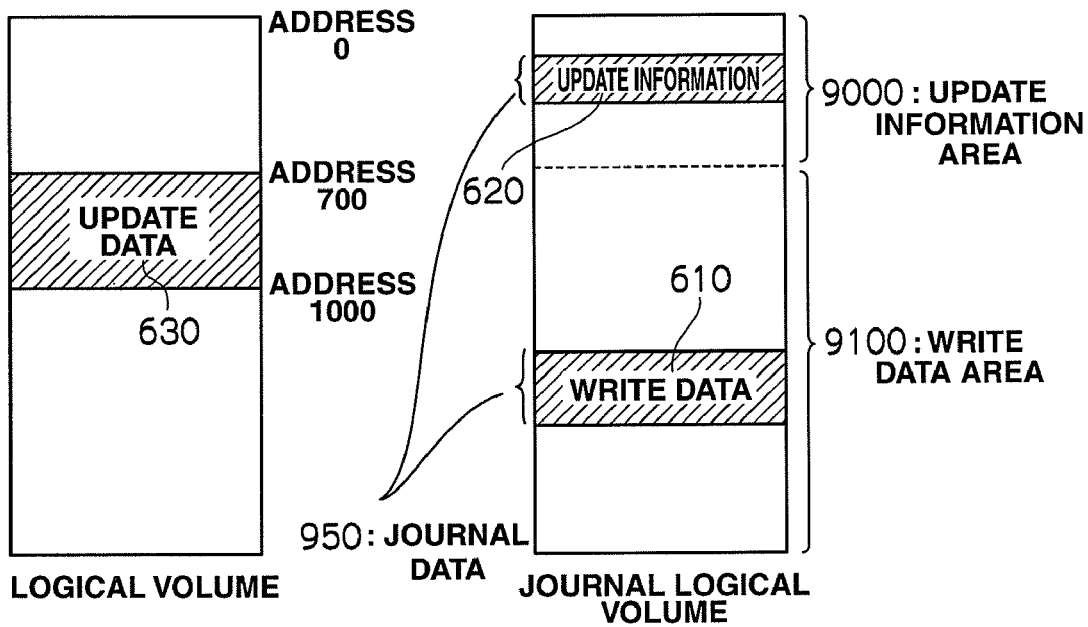
FIG. 8 shows journal data.

Journal data is explained in detail with reference to FIG. 8. FIG. 8 shows the state where data stored in an area from an address 700 to an address 1000 in a source logical volume is updated with update data 630. A journal logical volume, the other party in a journal group, consists of an update information area 900 and a write data area 9100. The update data 630 is written in the write data area 9100 as write data 610. In other words, the update data 630 in the source logical volume corresponds to the write data 610 in the journal logical volume. Update-related information—information as to which part in the source logical volume has been updated (for example, information indicating that data in the area from address 700 to address 1000 in the source logical volume has been updated)—is written in the update information area 9000 as update information 620.

A piece of journal data 950 consists of a piece of write data 610 and a piece of update information 620. In the update information area 9000, pieces of update information 620 are stored in order of update from the starting point of the area 9000, and when the storage point of the update information 620 reaches the end of the update information area 9000, it goes back to the starting point and subsequent pieces of update information 620 are stored from there in order. Likewise, in the write data area 9100, pieces of write data 610 are stored in their order of update from the starting point of the area 9100, and when the storage point reaches the end of the area 9100, it goes back to the starting point and subsequent pieces of write data 610 are stored from there in order. The capacity ratio of the update information area 9000 to the write data area 9100 may be fixed or changed as appropriate.

The operation for reflecting data update performed in the logical volume (ORG1) 110 of the first storage system 10 in the logical volume (Data 2) 200 of the third storage system 20 via the second storage system 15 is explained with reference to FIG. 1. When the host computer 30 write-accesses the first storage system 10, a write command is issued to the target channel adapter (CHA1) 50. When the target channel adapter (CHA1) 50 receives the write command, it writes write data 610 in a storage area 60-1A in the cache memory 60.

The write data 610 is then read from the storage area 60-1A in the cache memory 60 and written in the logical volume (ORG1) 110 by the relevant disk adapter 80. Meanwhile, the channel adapter (CHA2) 50, serving as an initiator, issues a write command to the target channel adapter (CHA3) 50 in the second storage system 15 via the communication line 330, requesting that the write data 610 written in the storage area 60-1A be written in the logical volume (Data 1) 150. When the target channel adapter (CHA3) 50 receives the write command, it writes the write data 610 in a storage area 60-2A in its own cache memory 60.

The target channel adapter (CHA3) 50 then writes a piece journal data 950 in a storage area 60-2B in the cache memory 60 in the second storage system 15. The storage area 60-2B has a First In First Out (FIFO) structure and stores pieces of journal data 950 in chronological order. The journal data is then written in the logical volume (JNL1) 151 by the disk adapter (DKA4) 80. Note that, in this embodiment, the logical volume (Data 1) 150 is a virtual volume, and the disk adapter (DKA3) 80 does not write anything in the logical volume (Data 1) 150.

The channel adapter (CHA5) 50 in the third storage system 20, serving as an initiator, issues a journal read command to the target channel adapter (CHA4) 50 in the second storage system 15 via the communication line 340 at an appropriate time (PULL method), requesting that the journal data be transferred thereto. Having received the journal read command, the target channel adapter (CHA4) 50 reads the pieces of journal data 950 accumulated in the storage area 60-2B, starting with the oldest piece, and transfers them to the channel adapter (CHA5) 50. The readout point for the journal data from the storage area 60-2B is specified with a pointer.

When the channel adapter (CHA5) 50 receives the pieces of journal data, it writes them into a storage area 60-3B in the cache memory 60 of the third storage system 20. The storage area 60-3B has a FIFO structure and accumulates the pieces of journal data 950 in a chronological order. The pieces of journal data are then written in the logical volume (JNL2) 201 by the disk adapter (DKA5) 80. The disk adapter (DKA5) 80 then reads the pieces of journal data from the logical volume (JNL2) 201 and writes corresponding pieces of write data 610 in a storage area 60-3A in the cache memory 60. The pieces of write data 610 written in the storage area 60-3A are then read by the disk adapter (DKA5) 80 and written in the logical volume (Data 2) 200. Because the journal data 950 is maintained in the logical volume (JNL2) 201 during the time the second storage system 20 is bearing a heavy load, it does not have to perform normalization processing for the journal data 950, but it can execute it when its load is lightened. Note that the second storage system 15 may alternatively transfer the pieces of journal data 950 to the third storage system 20 automatically (PUSH method).

By means of the aforementioned operations, remote copy by synchronous transfer (synchronous copy) is performed from the first storage system 10 to the second storage system 15 and remote copy by asynchronous transfer (asynchronous copy) is performed from the second storage system 15 to the third storage system 20. Synchronous copy refers to processing where, in the case of the present embodiment, when the first storage system 10 receives a data update request from the host computer 30, it transfers the data to the second storage system 15 and completion of the data update in the second storage system 15 guarantees completion of the data update in the first storage system 10.

Because the synchronous copy is performed from the first storage system 10 to the second storage system 15, the data image of the logical volume (ORG1) 110 always matches the data image of the logical volume (Data 1) 150 when they are seen from a macroscopic perspective. That means that, during the synchronous transfer of data, the two data images may not match due to the differences in measures of data transfer time and processing time (μsec) between the storage systems 10 and 15, but when the data update processing is complete, the two data images do match.

On the other hand, asynchronous copy refers to processing where, in the case of the present embodiment, when the second storage system 15 receives a data update request from the first storage system 10, it does not transfer the update data to the third storage system 20, but after completing the data update in itself, it transfers the update data to the third storage system 20 asynchronously. In other words, the second storage system 15 transfers, according to its own timing (for example, when its load is lightened), the data to the third storage system 20 asynchronously. Because the asynchronous copy is performed from the second storage system 15 to the third storage system 20, the data image in the logical volume (Data 2) 200 may match the data image in the logical volume (Data 1) 150 at a certain point in the past, but it does not necessarily match the data image of the present logical volume (Data 1) 150.

Figure 9:
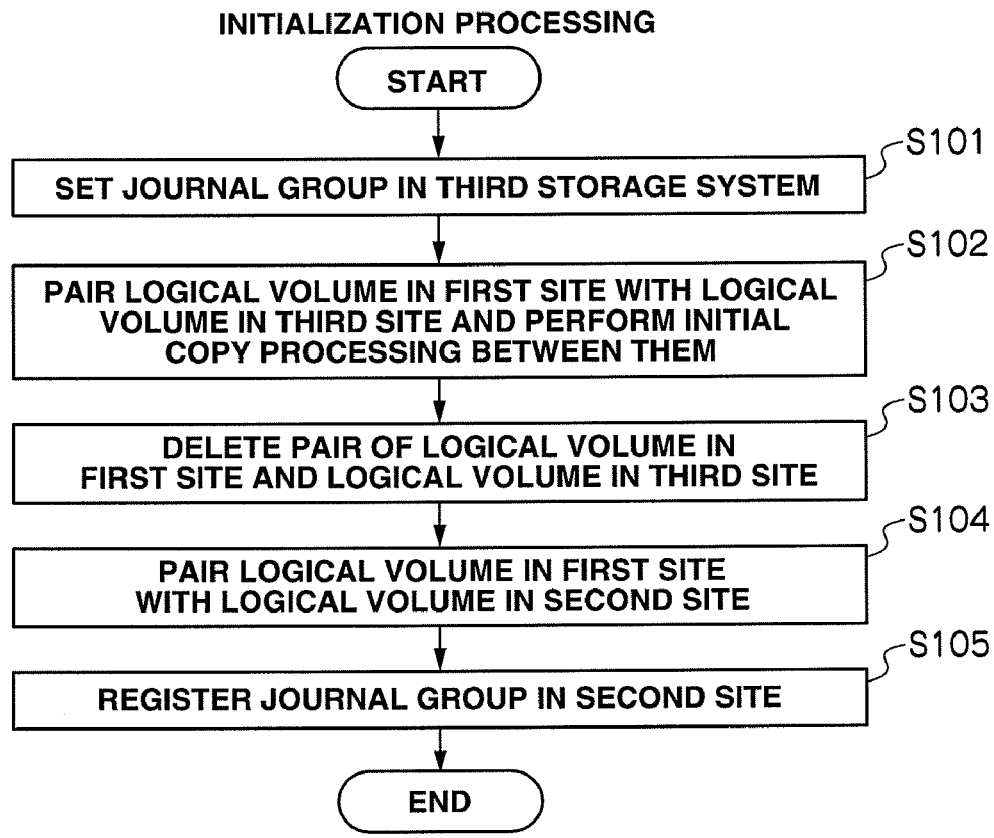
FIG. 9 shows a flowchart for initialization setting processing.

FIG. 9 is a flowchart showing an initial setting routine for the remote copy system 100. All the settings described below can be made by user input through Graphical User Interfaces (GUI) in the host computers 30 and 40 or in maintenance terminals. First, a user sets a journal group in the third storage system 20 (S101). Specifically, the user sets a journal group consisting of the logical volume (Data 2) 200 and the logical volume (JNL2) 201 in the journal group setting information table 600 in the third storage system 20.

The user then pairs the logical volume (ORG1) 110 with the logical volume (Data 2) 200 and the system 100 (FIG. 1) performs initial copy therebetween (S102). Consequently, the logical volume (ORG1) 110 and the logical volume (Data 2) 200 have the same data image. After completion of the initial copy, the pair relationship between the aforesaid volumes is terminated (S103). The user then sets a pair relationship between the logical volume (ORG1) 110 and the logical volume (Data 1) 150 (S104); and registers a journal group consisting of the logical volume (Data 1) 150 and the logical volume (JNL1) 151 in the journal group setting information table 600 (FIG. 7) (S105). The completion of the initial setting processing allows the second storage system 20 to perform normalization processing for write data.

Figure 10:
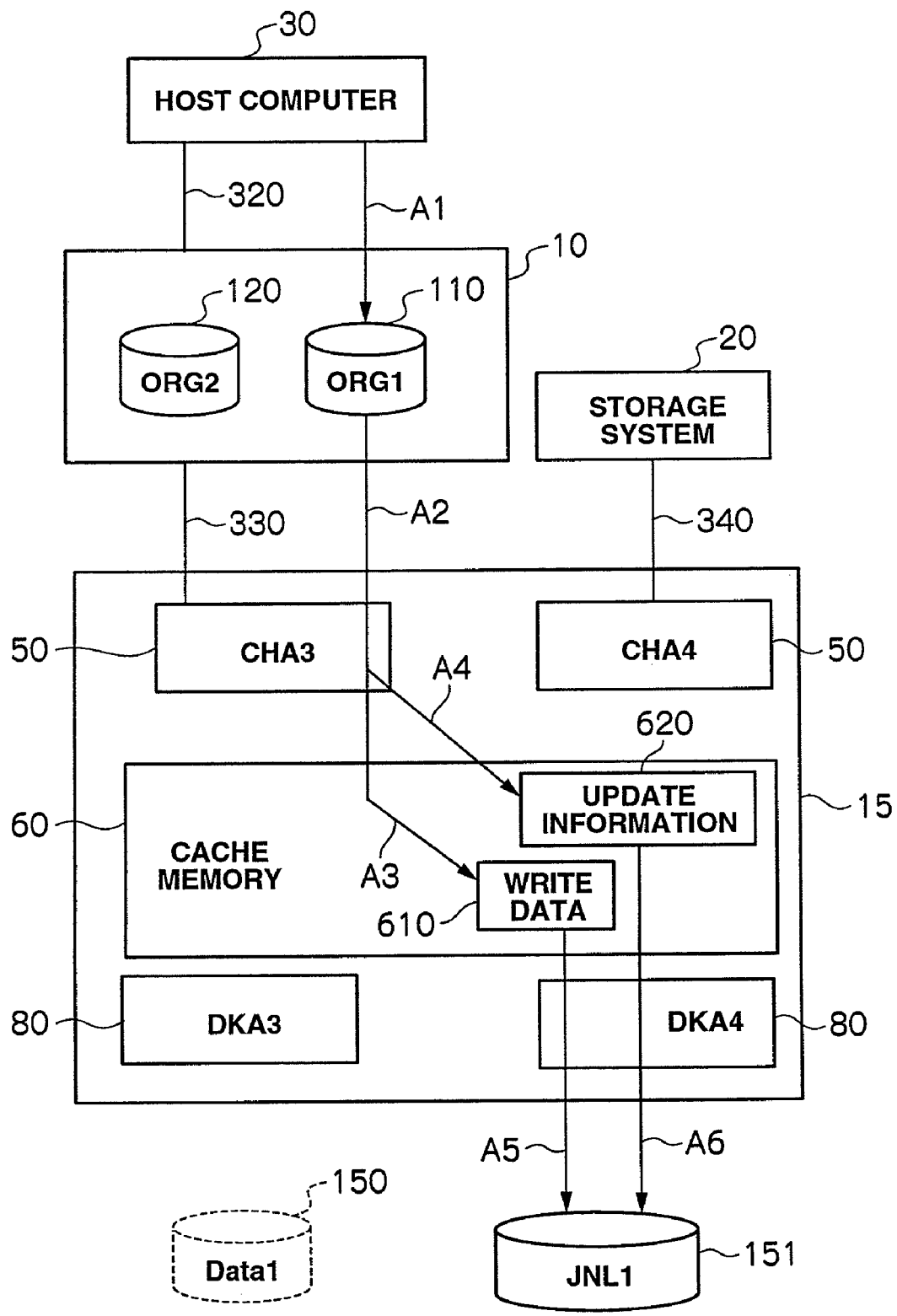
FIG. 10 illustrates access command receive processing.

FIG. 10 shows access receive processing performed by the second storage system 15. Components having the same reference numerals as in FIG. 1 indicate the same components as in FIG. 1. Thus, their detailed explanations are omitted. When the first storage system 10 receives a write command from the host computer 30, it writes data in a designated logical volume (ORG1) 110 (processing A1). Because the logical volume (ORG1) 110 in the first storage system 10 is paired with the logical volume (Data 1) 150 in the second storage system 15, the first storage issues a write command, the same as the write command it received from the host computer 30, to the second storage system 15 (processing A2).

The write command is received by the target channel adapter (CHA3) 50. The target channel adapter (CHA3) 50 then refers to the pair setting information table 500 to determine whether the logical volume (Data 1) 150, which is designated as a write destination target in the write command, is a substantial volume or a virtual volume. In the present embodiment, the logical volume (Data 1) 150 is set as a virtual volume, accordingly, the target channel adapter (CHA3) 50 handles the logical volume (Data 1) 150 as a non-physical volume; writes write data 610 in a storage area in the cache memory 60 corresponding to the write data area 9100 in the logical volume (JNL1) 151 (processing A3); and writes, as update information 620, information regarding where in the logical volume (Data 1) 150 the write command should be executed, in the storage area in the cache memory 60 corresponding to the update information area 9000 in the logical volume (JNL1) 151 (processing A4). The disk adapter (DKA4) 80 then writes the write data 610 and the update information 620 stored in the cache memory 60 in the logical volume (JNL1) 151 (processing A5 and A6).

Figure 11:
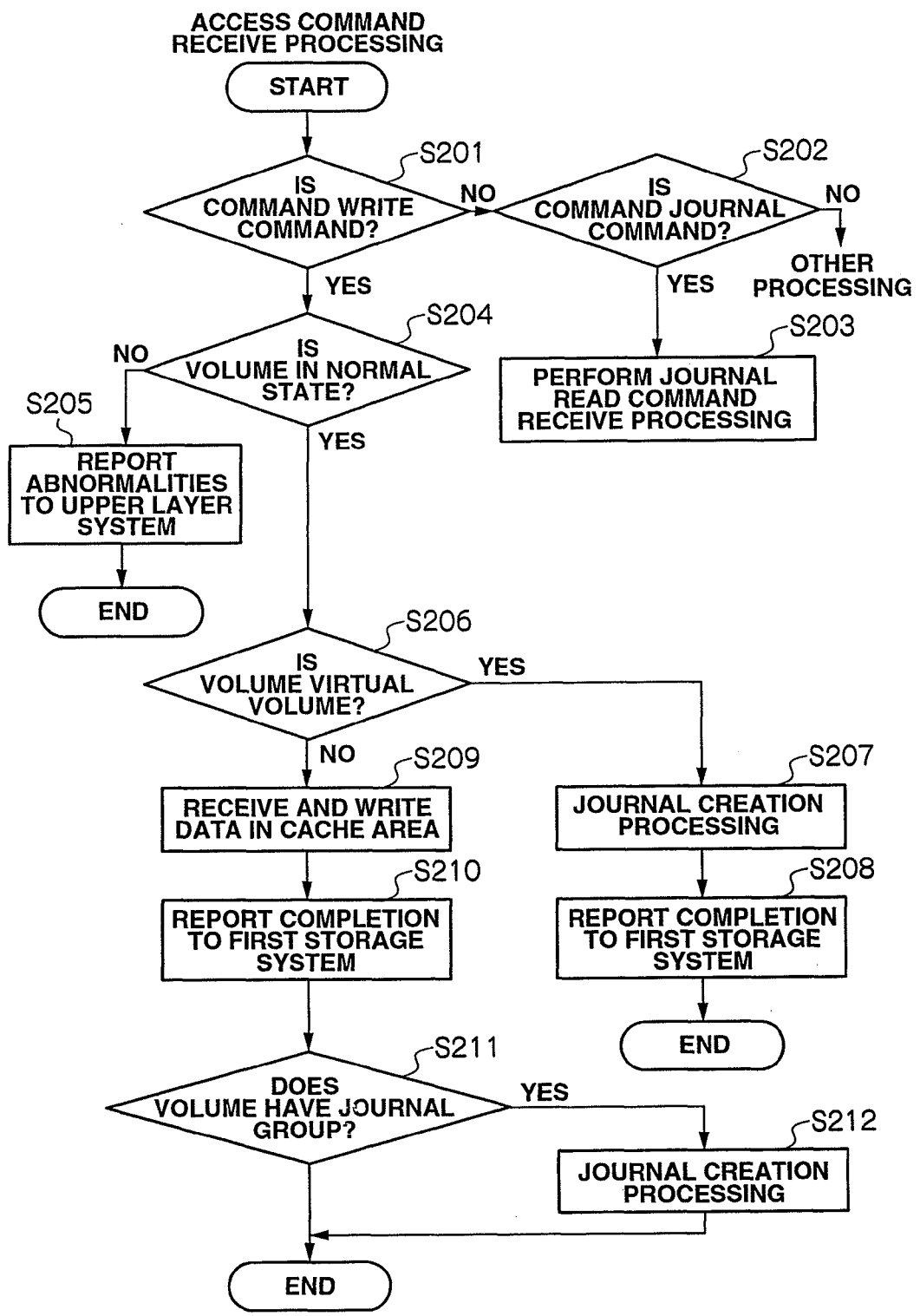
FIG. 11 shows a flowchart for the access command receive processing.

FIG. 11 is a flowchart for the access receive processing performed by the second storage system 15. When the target channel adapter (CHA3) 50 in the second storage system 15 receives an access command, it determines whether or not the access command is a write command (S201). If the access command is not a write command (S201; No) but is a journal read command (S202; Yes), it performs journal read command receive processing (S203). Details of the journal read command receive processing are described below. If the access command is a write command (S201; Yes), it determines whether or not the write destination volume is in a normal state (S204). If it is not in a normal state (S204; No), the target channel adapter (CHA3) 50 reports to that effect to the relevant maintenance device or an upper level system (the first storage system 10) (S205) and terminates the processing.

If the write destination volume is in a normal state (S204; Yes), the target channel adapter (CHA3) 50 refers to the pair setting information table 500 and determines whether or not the write destination logical volume is a virtual volume (S206). If it is a virtual volume (S206; Yes), the target channel adapter (CHA3) 50 writes journal data 950 in the logical volume (JNL1) 151 (S207) and reports to that effect to the host computer (S208). If the write destination logical volume is not a virtual volume (S206; No), it writes the data in a storage area in the cache memory 60 (S209) and reports to that effect to the host computer (S210). Then, it determines whether the write destination logical volume have a journal group (S211). If it has a journal group (S211; Yes), the target channel adapter (CHA3) 50 writes the journal data 950 in the logical volume (JNL1) 151 (S212). As explained, because the logical volume (Data 1) 150 is a virtual volume, it is possible to define it as the other party to the remote copy for the logical volume (ORG1) 110 without requiring a substantial storage capacity as a sub logical volume.

Figure 12:
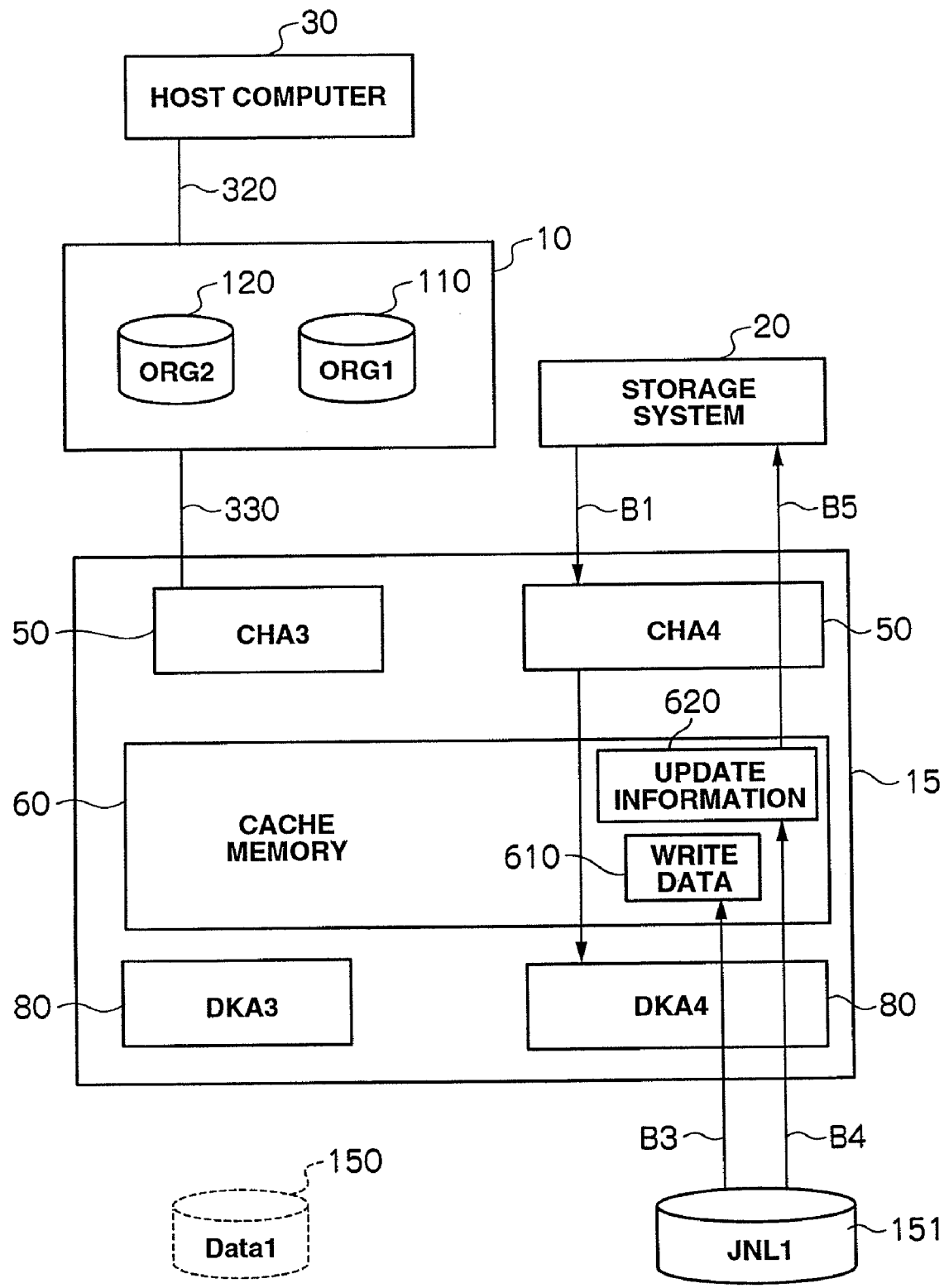
FIG. 12 illustrates journal read command receive processing.

FIG. 12 explains the operations performed by the target channel adapter (CHA4) 50 in the second storage system 15 that receives a journal read command. The target channel adapter (CHA4) 50 in the second storage system 15 receives a journal read command from the third storage system 20 (processing B1). If the logical volume (JNL1) 151 has an unsent piece of journal data 950, the target channel adapter (CHA4) 50 commands the disk adapter (DKA4) 80 to write the relevant update information 620 and write data 610 in the cache memory 60 (processing B2). The disk adapter (DKA4) 80 then reads the update information 620 and the write data 610 from the logical volume (JNL1) 151, writes them in the cache memory 60, and notifies the target channel adapter (CHA4) 50 of completion of reading (processing B3, B4). Notified by the disk adapter (DKA4) 80, the target channel adapter (CHA4) 50 reads the update information 620 and the write data 610 from the cache memory 60 and transmits them to the third storage system 20 (processing B5). Then, the cache memory where the journal data 950 has been written is released.

In the above explanation for the journal read command receive processing, the journal data 950 read from the logical volume (JNL1) 151 is written in the cache memory 60, however, if the journal data 950 exists in the cache memory 60, reading of the journal data 950 from the logical volume (JNL1) 151 is unnecessary. Moreover, in the above explanation, the second storage system 15 transmits unsent pieces of journal data 950 to the third storage system 20 one by one. However, it may alternatively transmit more than one piece of journal data 950 at a time.

The number of pieces of journal data sent in response to the journal read command may be specified in the command by the third storage system 20 or may be set by the user in the second storage system 15 or the third storage system 20 when registering the journal group. Alternatively, the number of pieces of journal data sent from the second storage system 15 to the third storage system 20 may be dynamically changed in accordance with the transfer performance or transmission load of the communication line 340. Regarding the release of the storage area where the journal data 950 has been written, the third storage system 20 may include the number for the storage area to be released in the journal read command so that the second storage system 15 releases it in accordance with the update number.

Figure 13:
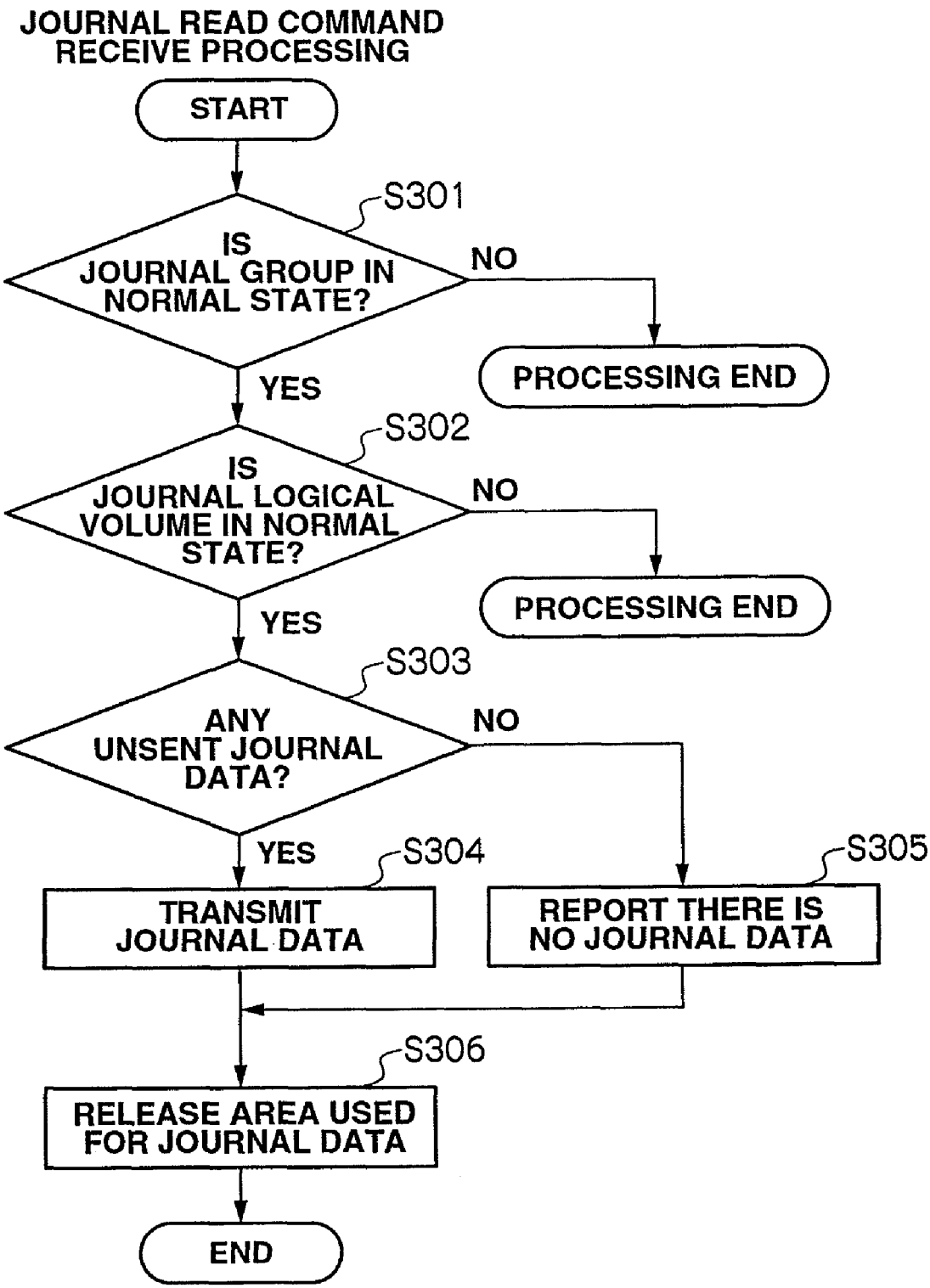
FIG. 13 shows a flowchart for the journal read command receive processing.

FIG. 13 is a flowchart illustrating the operations performed by the target channel adapter (CHA4) 50 in the second storage system 15 that receives a journal read command. When the target channel adapter (CHA4) 50 in the second storage system 15 receives an access command from the third storage system 20, and if the access command is a journal read command, it refers to the journal group setting information table 600 and checks whether or not the journal group in the second storage system 15 is in a normal state (S301). If the journal group has problems and is not in a normal state (S301; No), the target channel adapter (CHA4) 50 notifies the third storage system 20 of the state and terminates the processing.

If the journal group is in a normal state (S301; Yes), the target channel adapter (CHA4) 50 determines whether the logical volume (JNL1) 151 is in a normal state (S302). If it is not in a normal state (S302; No), the target channel adapter (CHA4) 50 changes the pair status entered in the journal group setting information table 600 to "failure," reports to that effect to the third storage system 20, and terminates the processing. If the logical volume (JNL1) 151 is in a normal state (S302; Yes), it checks whether the logical volume (JNL1) 151 has any unsent pieces of journal data 950 (S303).

If there are any unsent pieces of journal data 950 in the logical volume (JNL1) 151 (S303; Yes), the target channel adapter (CHA4) 50 transmits those pieces of journal data 950 to the third storage system 20 (S304). Having received the journal data 950, the third storage system 20 performs normalization processing to reflect the data update performed for the logical volume (ORG1) 110 in the logical volume (Data 2) 200. If there are no unsent pieces of journal data 950 left in the logical volume (JNL1) 151 (S303; No), the target channel adapter (CHA4) 50 reports to that effect to the third storage system 20 (S305). Then, it releases the storage area in the logical volume (JNL1) 151 where the journal data has been written (S306). In other words, once the data duplication between the first storage system 10 and the third storage system 20 is over, the second storage system 15 can release its own storage resource. Consequently, the second storage system 15 can use that storage resource for a new purpose.

Figure 14:
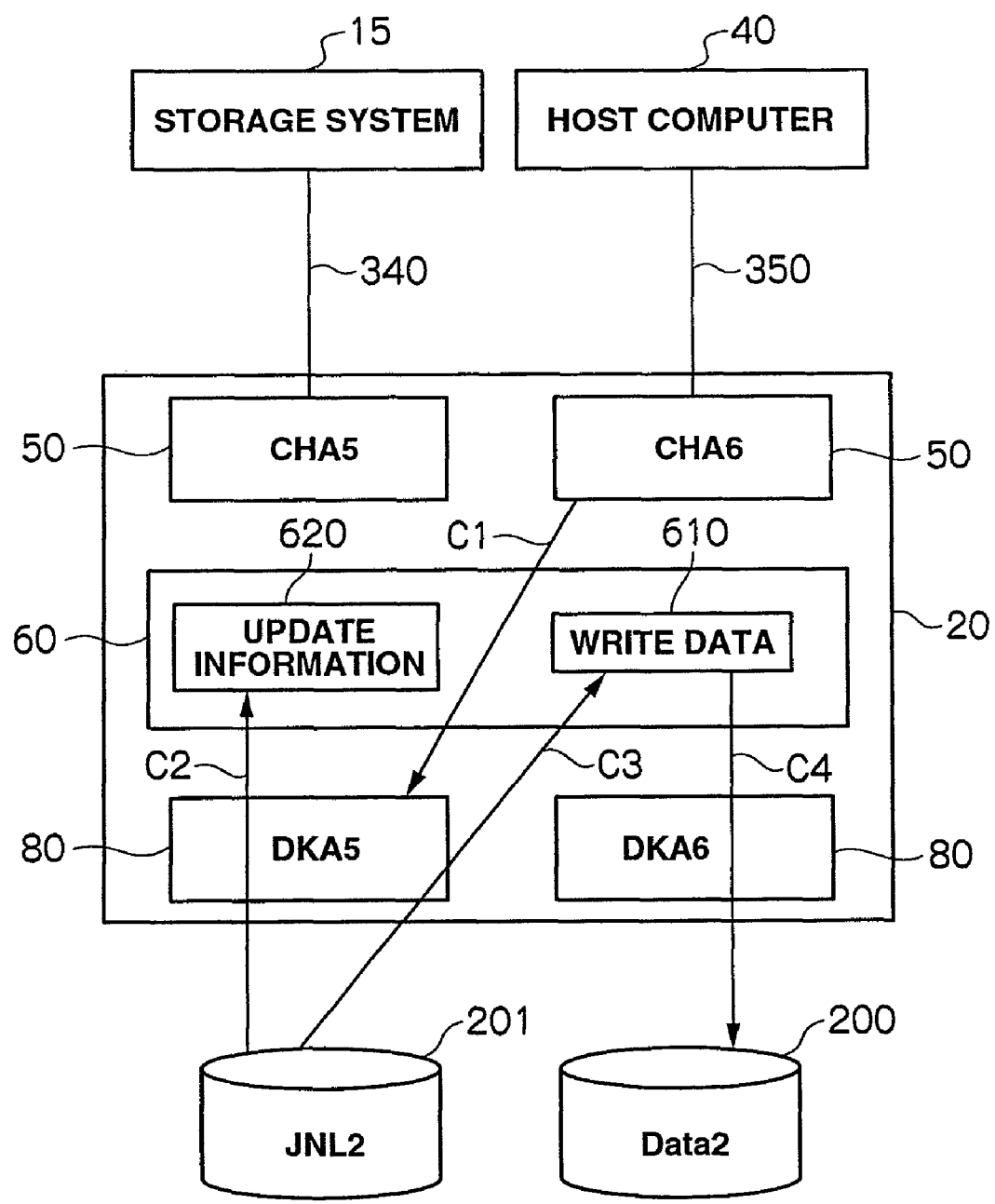
FIG. 14 illustrates normalization processing.

FIG. 14 shows operations performed by the channel adapter (CHA6) 50 in the third storage system 20 to update data in the logical volume (Data 2) 200 using the journal data 950. When the logical volume (JNL2) 201 includes pieces of journal data 950 that are to be normalized, the channel adapter (CHA6) 50 performs the normalization processing for them beginning with the oldest piece of journal data 950. Specifically, each piece of journal data may be given an update number so that the normalization processing is performed starting with the piece of journal data having a smallest update number (which means that that piece is the oldest one). In order to do so, the channel adapter (CHA6) 50 first secures the cache memory 60 and commands the disk adapter (DKA5) 80 to read the update information 620 and write data 610 for the oldest piece of journal data (processing C1).

The disk adapter (DKA5) 80 then writes the update information 620 and the write data 610 read from the logical volume (JNL2) 201 in the cache memory 60 (processing C2, C3). It then reads the write data 610 from the cache memory 60 and writes it in the logical volume (Data 2) 200 (processing C4). Then, the storage areas in the logical volume (JNL2) 201 where the reflected update information 620 and the write data 610 were stored are released. Note that the normalization processing may alternatively performed by the disk adapter (DKA5) 80.

Also note that, when the amount of unsent pieces of journal data in the logical volume (JNL1) 151 exceeds a threshold value, access from the host computer 30 to the first storage system 10 may be limited (for example, by slowing down the response time from the first storage system 10 to the host computer 30) so that priority is given to transfer of the journal data 950 from the second storage system 15 to the third storage system 20.

Figure 15:
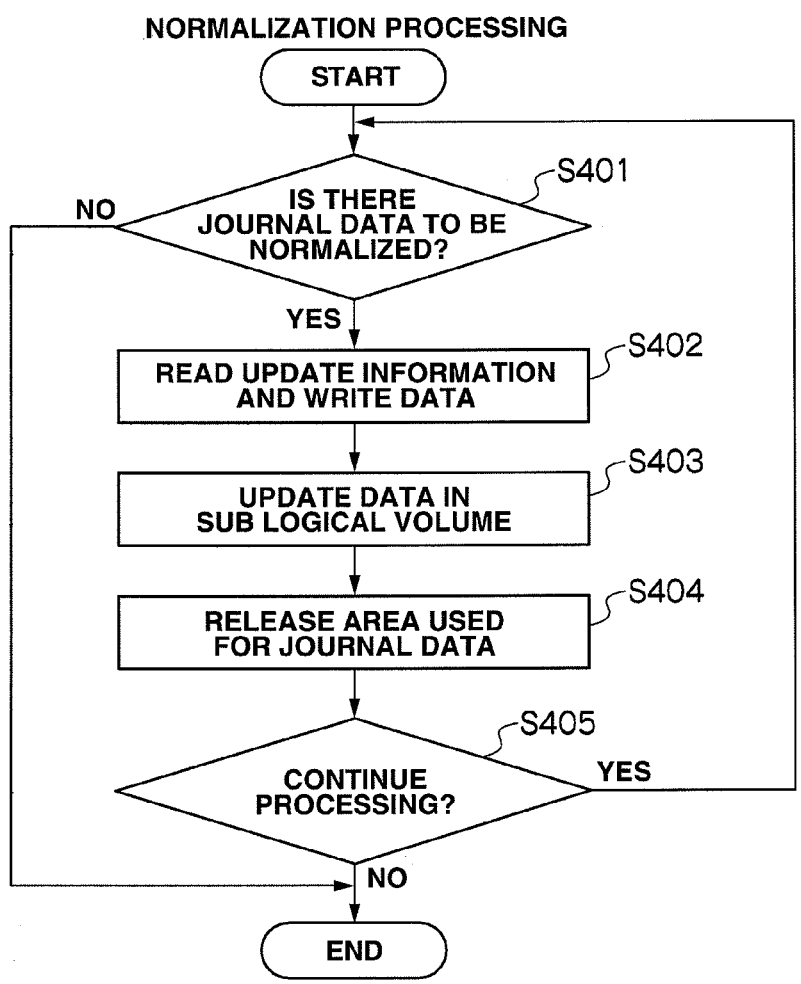
FIG. 15 shows a flowchart for the normalization processing.

FIG. 15 is a flowchart showing a normalization processing routine performed by the channel adapter (CHA6) 50 in the third storage system 20. The channel adapter (CHA6) 50 first determines whether there is any piece of journal data 950 to be normalized in the logical volume (JNL2) 201 (S401). If there is no such piece of journal data 950 (S401; No), the channel adapter (CHA6) 50 terminates the normalization processing and resumes it again after a certain period of time (S401). If there is a piece of journal data to be normalized (S401; Yes), the channel adapter (CHA6) 50 commands the disk adapter (DKA5) 80 to read the relevant update information 620 and write data 610 from the logical volume (JNL2) 201 to the cache memory 60 (S402). The disk adapter (DKA5) 80 then writes the write data 610 read out to the cache memory 60 in the logical volume (Data 2) 200, thereby updating the data in the logical volume (Data 2) 200 (S403). After that, the storage areas in the logical volume (JNL2) 201 where the update information 620 and the write data 610 were stored are released (S404). The channel adapter (CHA6) 50 then decides whether to continue the normalization processing (S405), and if it decides to continue (S405; Yes), it returns to step 401.

Figure 16:
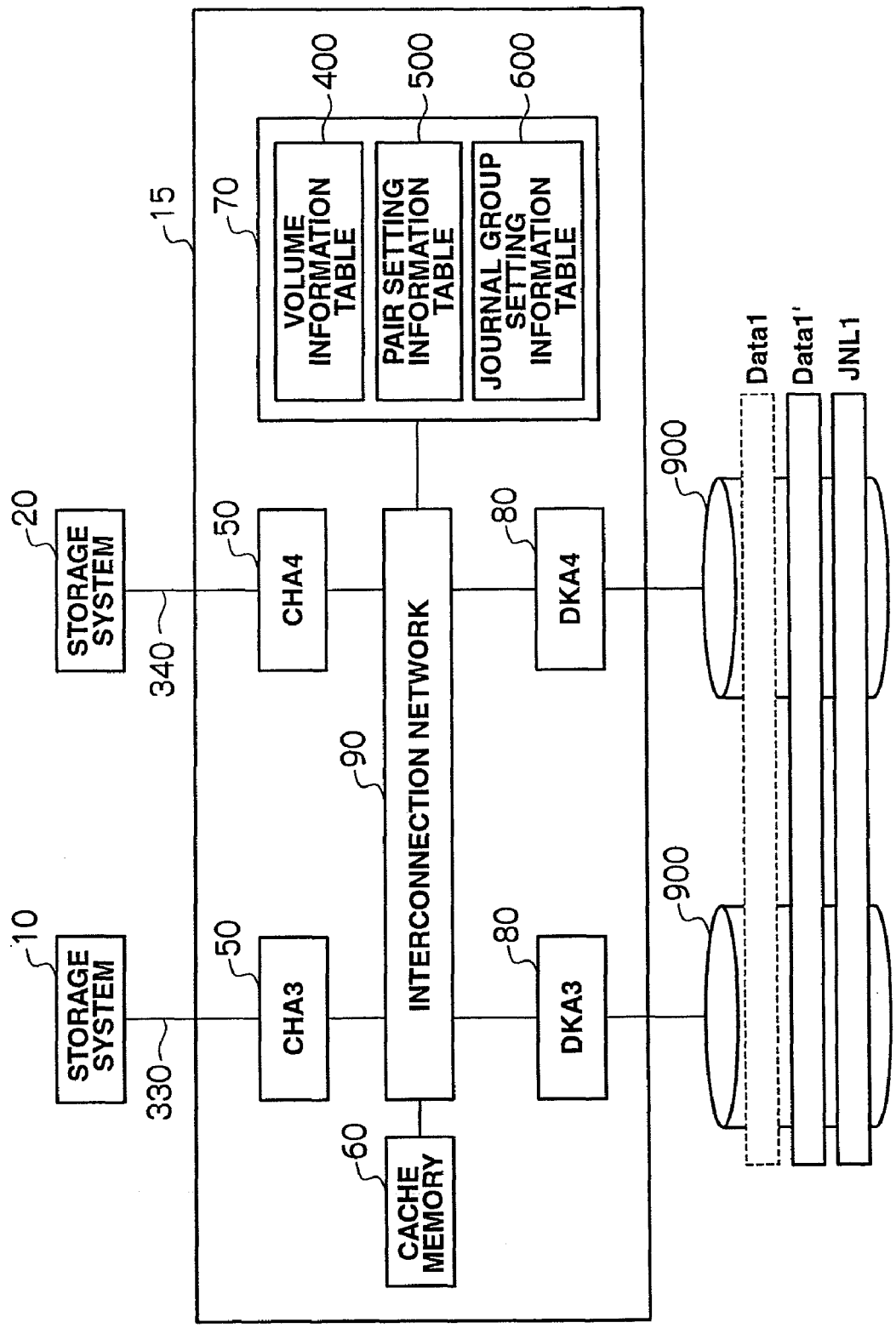
FIG. 16 shows the structure of a second storage system.

FIG. 16 is a flowchart showing a processing routine for synchronizing the data image of the first storage system 10 with that of the third storage system 20 upon the occurrence of failover. When a failure occurs in the first storage system 10, it can no longer respond to input/output requests from the application program 31 in the host computer 30. The application program 31 retries to access the first storage system 10 but the system goes down. The cluster software 32 then detects the failure and transmits an activation command to the alternate cluster software 42. Having received the activation command from the operational cluster software 32, the alternate cluster software 42 activates the resource group 41 (S501). Consequently, an activation script is executed (S502). When the activation script is executed, primary-sub switching processing (horctakaover command) is executed (S503).

In the primary-sub switching processing, the status of the pair—the logical volume (Data 1) 150 as a primary logical volume and the logical volume (Data 2) 200 as a sub logical volume—is temporarily put in a suspended state. In this situation, first, an unsent piece of journal data 950 is transmitted from the second storage system 15 to the third storage system 20 and the data in the logical volume (Data 2) 200 is updated. The number of unsent pieces of journal data 950 left in the second storage system 15 can be ascertained by the third storage system sending an inquiry to the second storage system 15. Specifically, the storage apparatus management software 41b in the host computer 40 writes a command (command to inquire of the second storage system 15 as to the amount of remaining unsent journal data 950) in a command device 60-3C in the third storage system 20 and the channel adapter (CHA5) 50 makes an inquiry to the second storage system 15.

When the data image of the logical volume (Data 1) 150 is synchronized with the data image of the logical volume (Data 2) 200 (P-S synchronization) as described above, processing to switch the logical volume (Data 2) 200 to a primary logical volume and the logical volume (Data 1) 150 to a sub logical volume is performed (P-S swap processing). A sub logical volume is usually protected from write access, thus by switching the logical volume (Data 2) 200 to a primary logical volume, the host computer 40 can write-access the logical volume (Data 2) 200. After completion of the primary-sub switch processing, the storage apparatus management software 41b checks whether the file system is damaged (S504); confirms that the file system is operating normally; and mounts it on the third storage system 20 (S505), and activates the application program 41a (S506). Consequently, the host computer 40 can take over the processing the host computer 30 was performing at the time of the failover by using the third storage system 20.

Data duplication performed upon the occurrence of a failure in the third storage system 20 is explained below. In the present embodiment, the logical volume (Data 1) 150 in the second storage system 15 is a non-physical, virtual volume. When a failure occurs in the third storage system 20, actual data is left in only the first storage system 10, thus it is desirable to enhance failure tolerance by duplicating the data. When a failure occurs in the third storage system 20, the second storage system 15, automatically or in accordance with a user's setting, assigns a logical volume (Data 1') to the physical volume 900 as shown in FIG. 16. The logical volume (Data 1') is an actual volume having addresses for the first storage system 10 to specify storage areas provided by the second storage system 15. In order to synchronize the logical volume (Data 1') and the logical volume (ORG1) 110, the status of the pair of the logical volume (ORG1) 110 and the logical volume (Data 1) 150 is put in a 'suspended' status and initial-copy is performed from the logical volume (ORG1) 110 to the logical volume (Data 1').

During the initial copy, pieces of information on data the update performed for the logical volume (ORG1) 110 from the host computer 30 are accumulated as difference information bitmaps. When the initial copy from the logical volume (ORG1) 110 to the logical volume (Data 1') is completed, the data in the logical volume (Data 1') is updated based on the difference information bitmaps. When the logical volume (ORG1) 110 is thus synchronized with the logical volume (Data 1'), their statuses are respectively set as "paired" statuses. Consequently, data update performed for the logical volume (ORG1) 110 is reflected in the logical volume (Data 1'), thereby duplicating the data.

The determination whether a failure has occurred in the third storage system 20 can be performed using, for example, a command device 60-1C in the first storage system 10 and a command device 60-2C in the second storage system 15. First, the host computer 30 writes a command in the command device 60-1C to have the first storage system 10 check whether the second storage system 15 is operating normally.

In response to the command, the first storage system 10 checks whether the second storage system 15 is performing normally via mutual communication. The first storage system 10 also writes a command in the command device 60-2C to have the second storage system 15 check whether the third storage system 20 is operating normally. In response to the command, the second storage system 15 checks whether the third storage system 20 is operating normally via mutual communication.

Details of the command devices are given below. Control commands, such as commands requesting logical volume pair setting and pair deletion, are written in the command devices 60-1C, 60-2C, and 60-3C in the first to third storage systems. A control command is generated by the host computer 30 at the first site and issued to the command device 60-2C in the second site and to the command device 60-3C in the third site. A command can take one of two routes—from the host computer 30 at the first site via the IP network "communication line" 310 to a host computer 40A (having almost the same structure as the host computer 30) at the second site and then to the command device 60-2C in the second storage system 15, or to the host computer 40 at the third site and then to the command device 60-3C in the third storage system 20; or from the host computer 30 to the command device 60-2C or 60-3C via a direct connection path 330 between a virtual volume formed in a storage area of the first storage system 10 and the second storage system 15 or the third storage system 20.

Figures 17, 18:
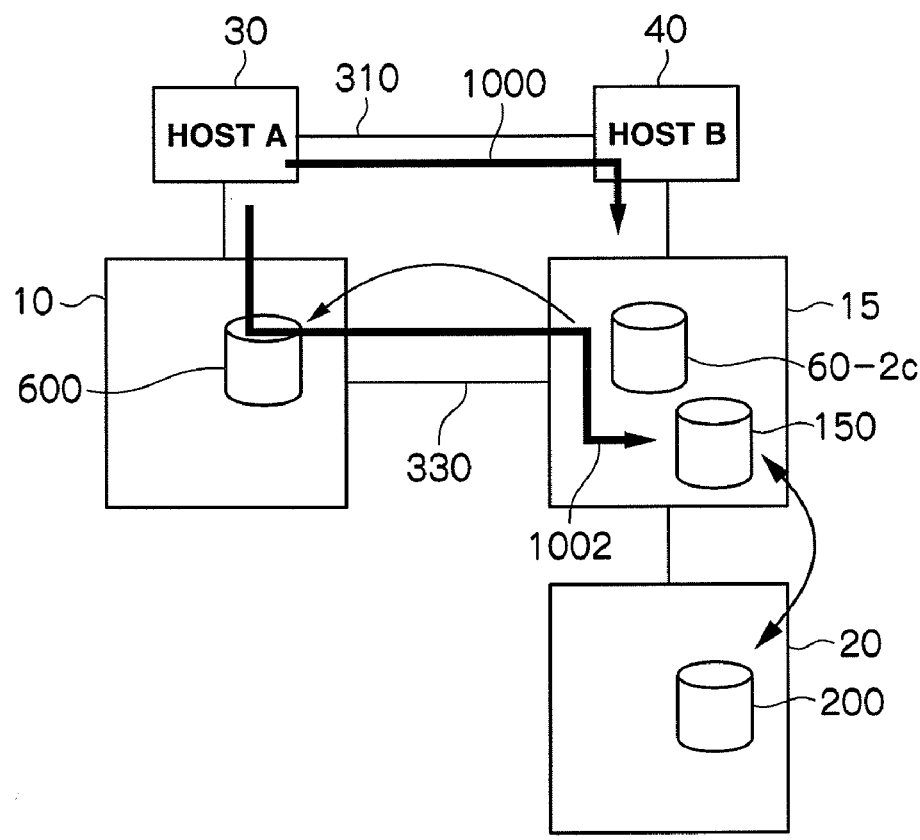
FIG. 17 is a block diagram showing a storage control system, explaining the state where a command device in a second storage controller is mapped onto a virtual volume in a first storage controller.
FIG. 18 shows a mapping table where correspondence relationships between virtual volumes and command devices are shown.

FIG. 17 is a block diagram of the storage control system showing the transmission routes for commands. An arrow 1000 indicates the transmission route between the host computers via the IP link. An arrow 1002 indicates the route via a virtual volume 600 formed in the first storage system 10. The command device 60-2C in the second storage system 15 is mapped onto the virtual volume. Note that there are two types of virtual volumes—a virtual volume a storage volume is mapped onto as explained above, and a virtual volume a command device is mapped onto. To distinguish them from each other, the latter virtual volume is sometimes called the "remote command device" for convenience. Although it has already been explained above, a virtual volume in a storage system is a logical volume recognized by the host computers, but it does not actually exist in the storage system; it exists in an external storage system connected thereto. When the host computer 30 accesses the virtual volume 600, it recognizes it as the command device 60-2C in the second storage system 15 at the second site.

When the host computer 30 generates a control command to be sent to the command device in the second storage system 15 and issues it to the virtual volume 600 (arrow 1002), the control command is transmitted via the transmission route 330, which directly connects the first storage system 10 and the second storage system 15, to the command device 60-2C in the second storage system 15 and set therein. The CHA controller in the second storage system 15 processes the control command and updates the control table in its shared memory so that, for example, its logical volume 150 pairs with the logical volume 200 in the third storage system 20. Control commands issued to virtual volumes are transmitted between the storage systems via their own cache memory.

Of the two routes for the host computer 30 to set a control command in the command device in the second storage system, one route may be set as a main route and the other as an alternate route. In the case of FIG. 17, the route 310 between the host computer 30 and the host computer 40 is set as a main route and the route from the host computer 30 via the virtual volume 600 to the second storage system is set as an alternate route, or vice versa. When the host computer 30 detects a trouble in communication with the host computer 40, it transmits a control command to the command device 60-2C in the second storage system 15 via the virtual volume 600. As already mentioned, examples of control commands include commands requesting logical volume pair setting, pair deletion, and reference for pair statuses.

FIG. 18 is a command device mapping table set in the shared memory 70 in the first storage system 10. LUNs of virtual volumes mapped onto command devices in the storage systems are entered in the LUN field. Names of the storage systems command devices belong to are entered in the apparatus field. The LUNs of the command devices in the second and third storage systems, the command devices being substantial logical devices, are entered in the command device LUN field. In FIG. 18, the virtual volume with the LUN number 0 in the first storage system 10 corresponds to the command device (60-2C) with the LUN number 0 in the second storage system 15; and the virtual volume with the LUN number 1 in the first storage system 10 corresponds to the command device (60-3C) with the LUN number 1 in the third storage system 20.

Figures 19, 20:
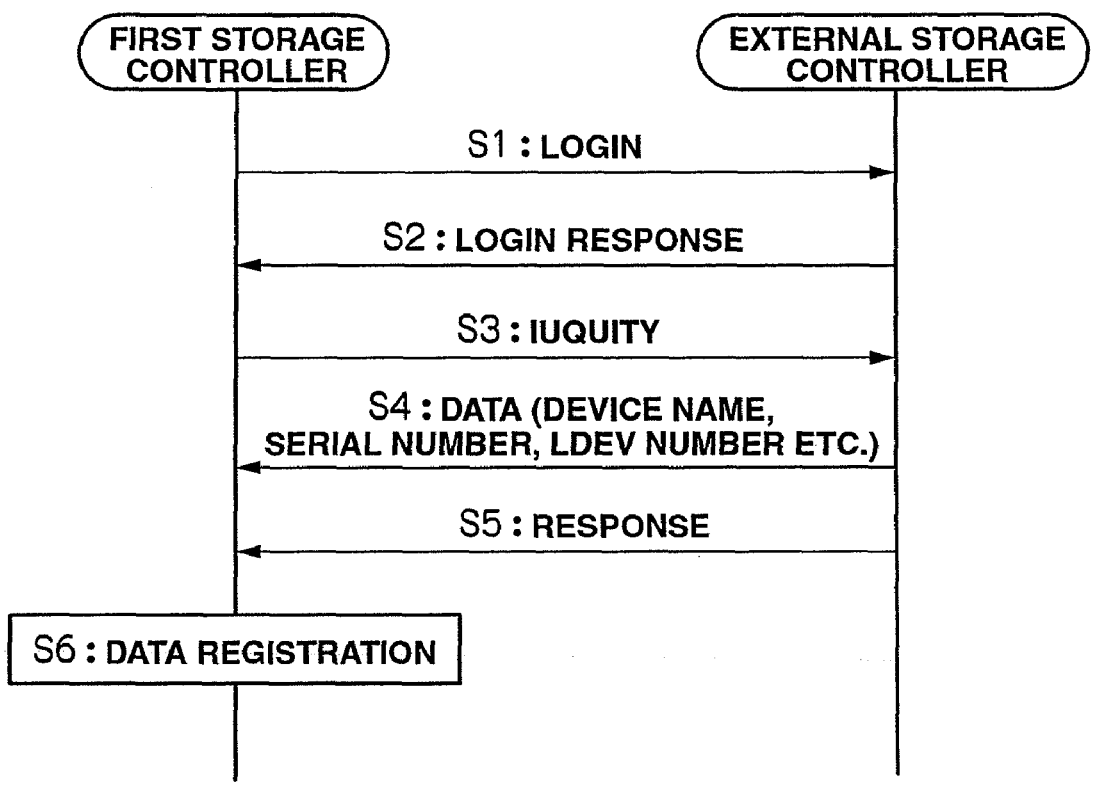
FIG. 19 shows an example of a control information table for virtual volumes mapped onto command devices.
FIG. 20 is a timing flowchart explaining operations performed by the first storage controller to create a table.

The shared memory 70 also has a remote command device management table for having the host computer recognize that a virtual volume is a "remote command device," which is a virtual volume a command device in an external storage system is mapped onto. The table stores LUNs for remote command devices (virtual volumes) and attributes of the external command devices the remote command devices are mapped onto. FIG. 19 schematically shows the table. Command device attribute information includes information for paths to command devices and storage capacities of the command devices. Bit information includes: a first attribute bit indicating whether a virtual volume is a remote command device mapped onto an external command device; and a second attribute bit indicating whether required information has already been provided in the table as command device attribute information. Path information for a command device may include identification information (a WWN), unique for each communication port, and an LUN for identifying the command device.

FIG. 20 shows the timing flow for operations performed by the CHA controller in the first storage system 10 to create a mapping table, which is necessary when mapping a command device to a virtual volume in the first storage system 10. As shown in FIG. 1, the first storage system 10 logs into the second storage system 15 or the third storage system 20 via a channel adapter CHA2 initiator port (S1). The login completes when the external storage system—the second storage system 15 or the third storage system 20—responds to the login (S2). The first storage system 10 then transmits an inquiry command defined by the Small Computer System Interface (SCSI) standard to the external storage system and makes an inquiry about the details of logical devices in the external storage system (S3).

An inquiry command is used to clarify the type and structure of an external storage system and the physical structure of logical devices in the external storage system can be ascertained by the command's passing through the layers in the external storage system. By using the inquiry command, the first storage system 10 can obtain information including: system name, device type, serial number (product ID), logical volume number, information for various versions, and a vendor ID, from the external storage system (S4). The external storage system responds to the inquiry by transmitting the inquired information to the first storage system 10 (S5). The first storage system 10 then automatically assigns virtual volumes to the respective command devices, registers necessary information in the aforementioned remote command control information table and the mapping table (S6), and enters a bit indicating that the virtual volumes have been registered as remote command devices in the remote command control information table. Consequently, when the host computer 30 accesses a virtual volume inside, it recognizes it as a command device in an external storage system, thereby controlling the external storage system by issuing a control command to it via the bus between the storage systems. When the first storage system 10 transmits/receives data to/from the command device 60-2C in the external storage system, which the remote command device 600 (FIG. 17) in the first storage system 10 is mapped onto, it needs to perform required address conversion.

Figure 21:
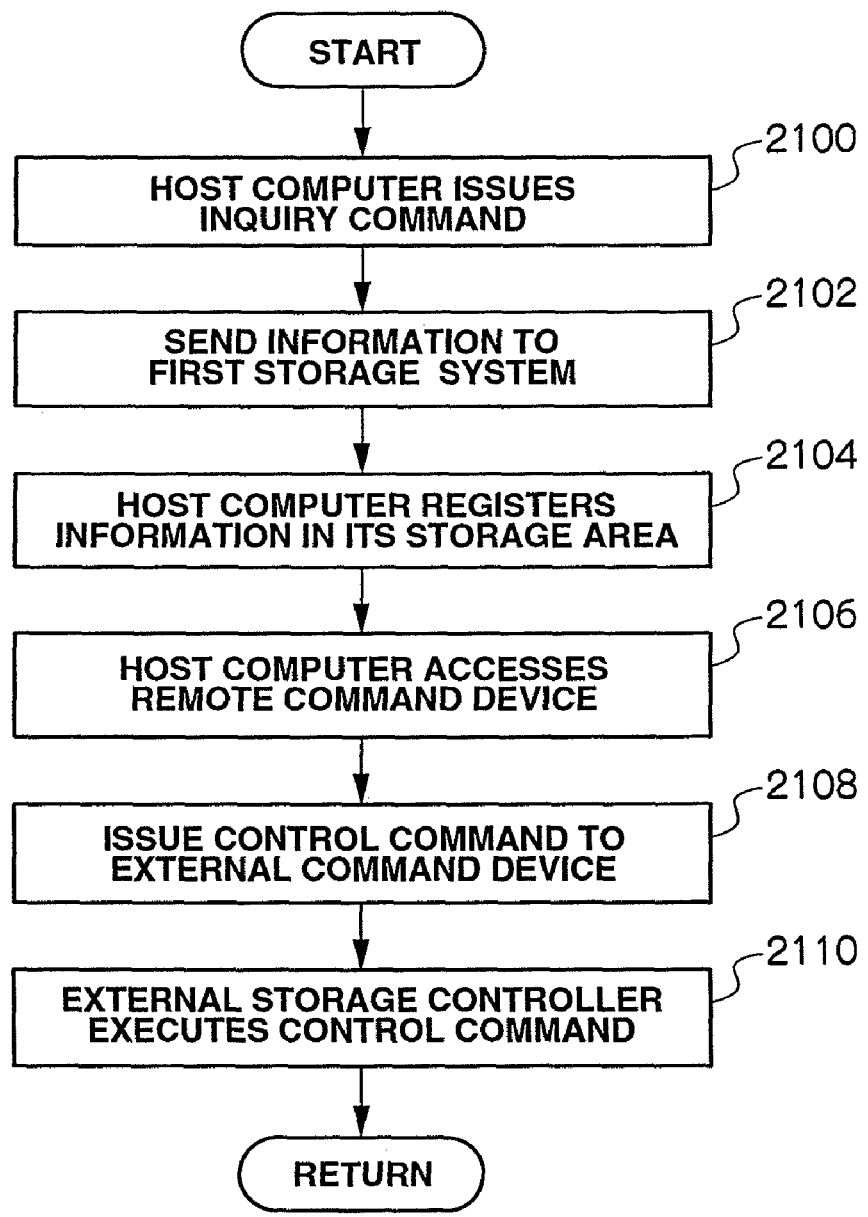
FIG. 21 shows a flowchart for control command issuance by a host computer.

FIG. 17 shows the operations performed when the host computer 30 issues a control command to a command device in the external storage system 15 via a remote command device. FIG. 21 shows a flowchart for the operations. First, when the host computer 30 issues an inquiry command to the first storage system 10 (2100), the CHA controller in the first storage system 10 reads the content of the remote command device attribute information table (FIG. 19) in its shared memory 70 (FIG. 2) and sends it to the host computer 30 (2102).

The host computer 30 registers, in its own storage area, information which is necessary to recognize the remote command device 600 in the first storage system 10 as the command device 60-2C in the external storage system 15 (2104). Thereby, the host computer 30 allows the user (for example, a client device connected to the host computer 30) to access the command device in the external storage system 15. When the host computer 30 specifies and issues a control command to the command device 60-2C, the first storage system 10 refers to the remote command device control information table, allows the host computer 30 to access the virtual volume (remote control device) 600 (2106), and writes the control command in a storage area in the cache memory corresponding to the virtual volume.

The first storage system 10 then refers to the mapping information table and transmits the control command issued to the remote command device to the command device 60-2C via the communication path between the storage systems (2108). The CHA in the external storage system 15 processes the control command set in its command device 60-2C, transmits the processing result to the host computer 30 via the first storage system 10, and completes the series of operations. Note that the first storage system 10 can register latest information in its shared memory by updating the remote command control information table and the mapping table as appropriate. The host computer 30 can obtain the latest information by issuing inquiry command as appropriate. When the first storage system 10 receives a command from the host computer 30, the CHA in the first storage system 10 determines whether the command is addressed to the command device in the external storage system and executes the operations in the flowchart in FIG. 21 when the aforesaid determination is positive. If the command is an input/output command addressed to a data volume, normal input/output processing is performed. If no remote command device is registered in the first storage system 10 or if there is trouble in communication between the storage systems, the first storage system 10 notifies the host computer 30 that a command cannot be issued to a target command device. In this case, the host computer 30 can transmit a control command to the host computer connected to the external storage system via the IP link between the host computers. The operations in the flowchart in FIG. 21 may alternatively be performed when there is trouble in the communication between the host computers.

Figure 22:
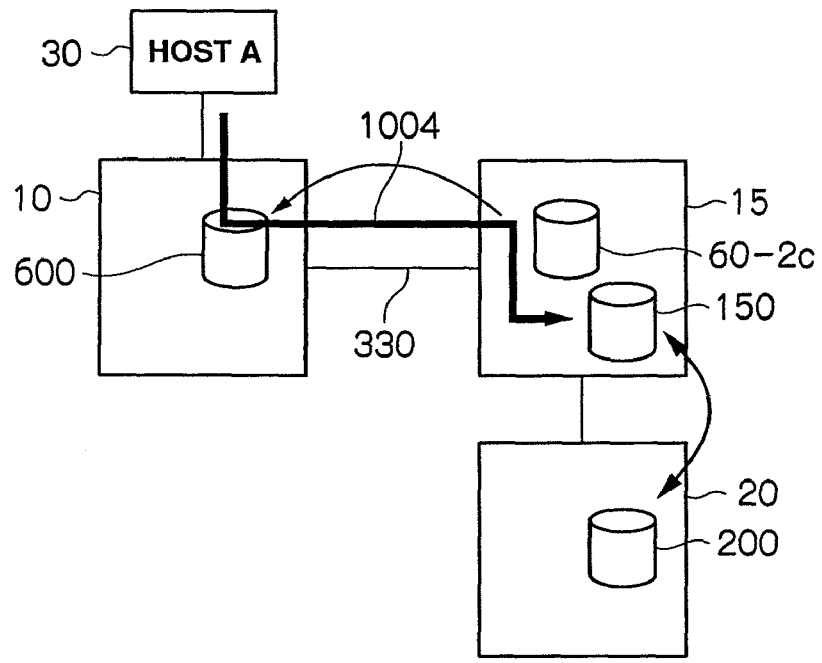
FIG. 22 is a block diagram showing a modified example of FIG. 17.

FIG. 22 is a modified example of FIG. 17, where a host computer is connected only to the first storage system 10. In this example, a control command cannot be transmitted between host computers but it can be transmitted from the host computer 30 to the second storage system 15 via the remote command device 600 in the first storage system 10 (arrow 1004). In this example, an IP link between host computers can be deleted.

Figure 23:
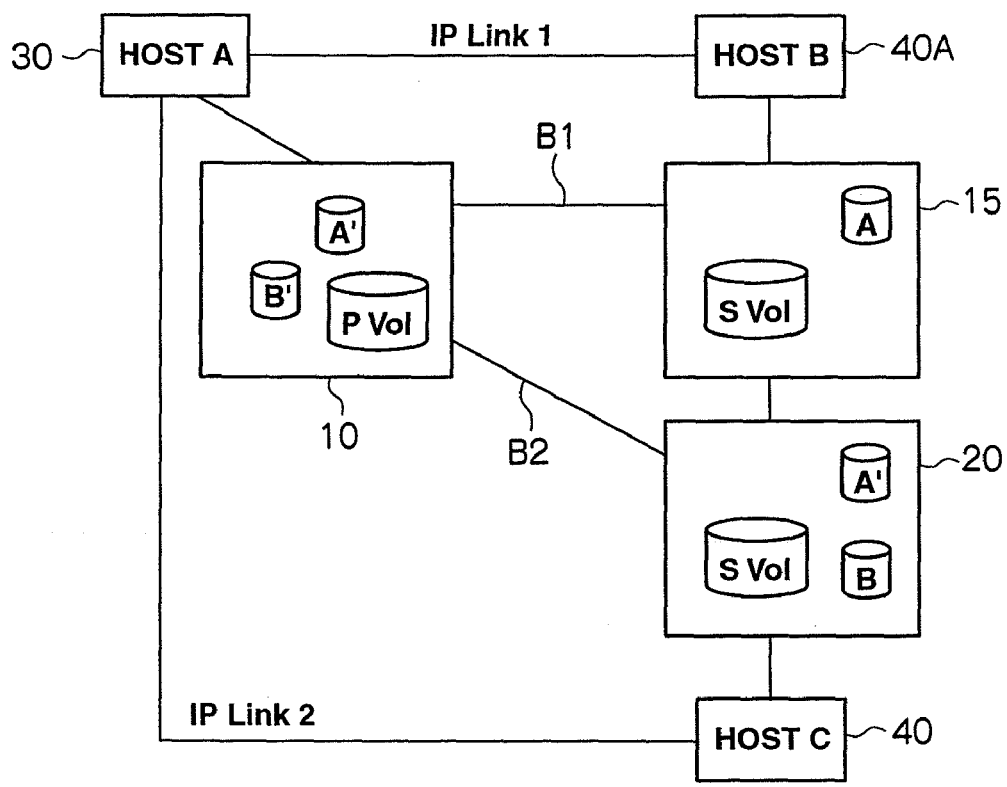
FIG. 23 is a block diagram showing another modified example of FIG. 17.

FIG. 23 is another modified example of FIG. 17, where an IP link is formed between the host computer 30 connected to the first storage system 10 and the host computer 40A connected to the second storage system 15, and another IP is formed between the host computer 30 and the host computer 40 connected to the third storage system 20. Moreover, the first storage system 10 and the second storage system 15 are connected via a bus B1, and the second storage system 15 and the third storage system 20 are also connected via bus B2. The first storage system 10 has a virtual volume A' corresponding to a command device A in the second storage system 15 and a virtual volume B' corresponding to a command device B in the third storage system 20. The third storage system 20 has a virtual volume A' corresponding to the command device A in the second storage system 15.

Figure 24:
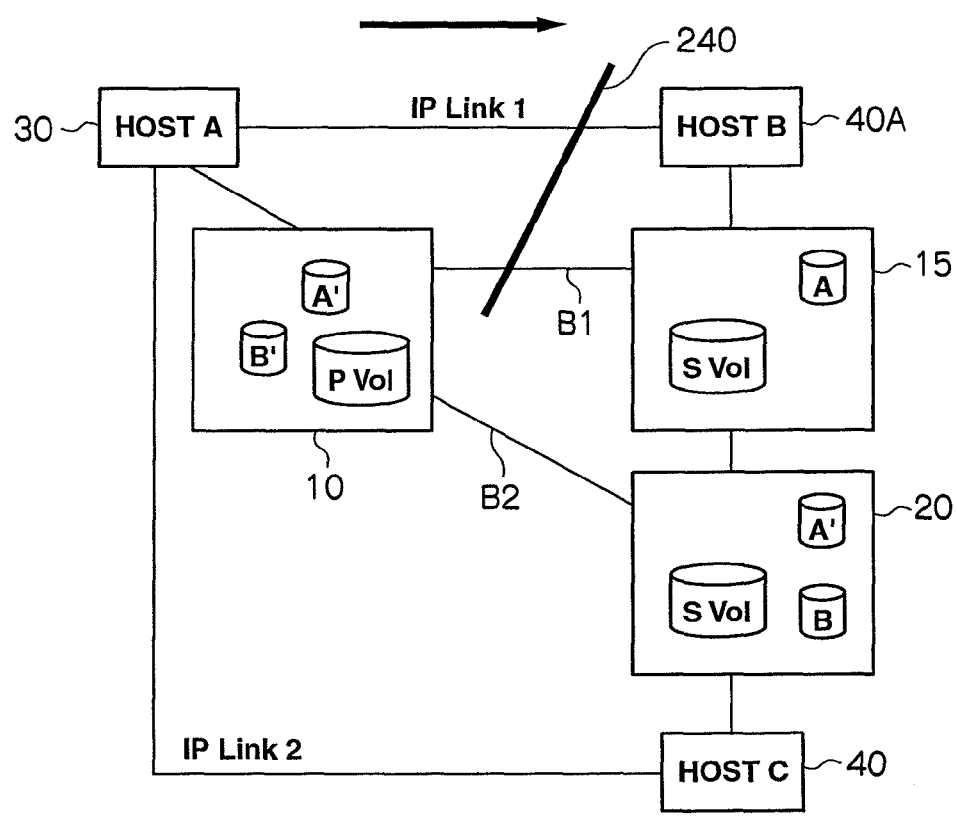
FIG. 24 is a block diagram showing a process of control command transmit processing in the system in FIG. 23.
Figure 25:
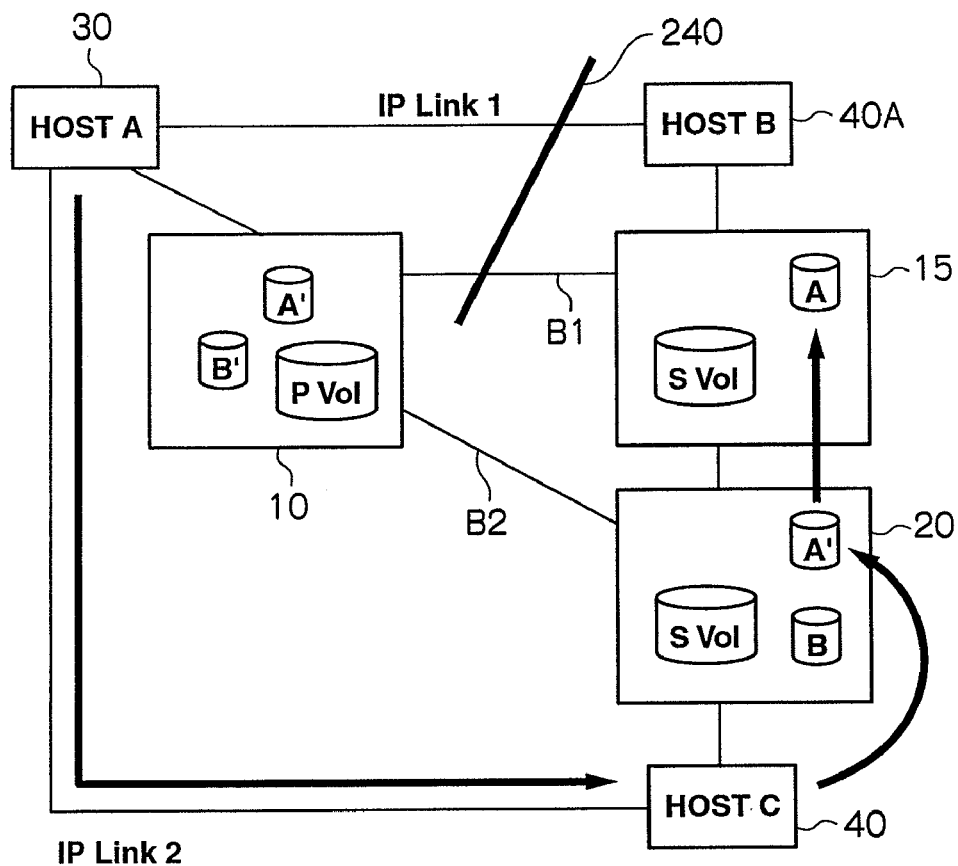
FIG. 25 is a block diagram showing another process.
Figure 26:
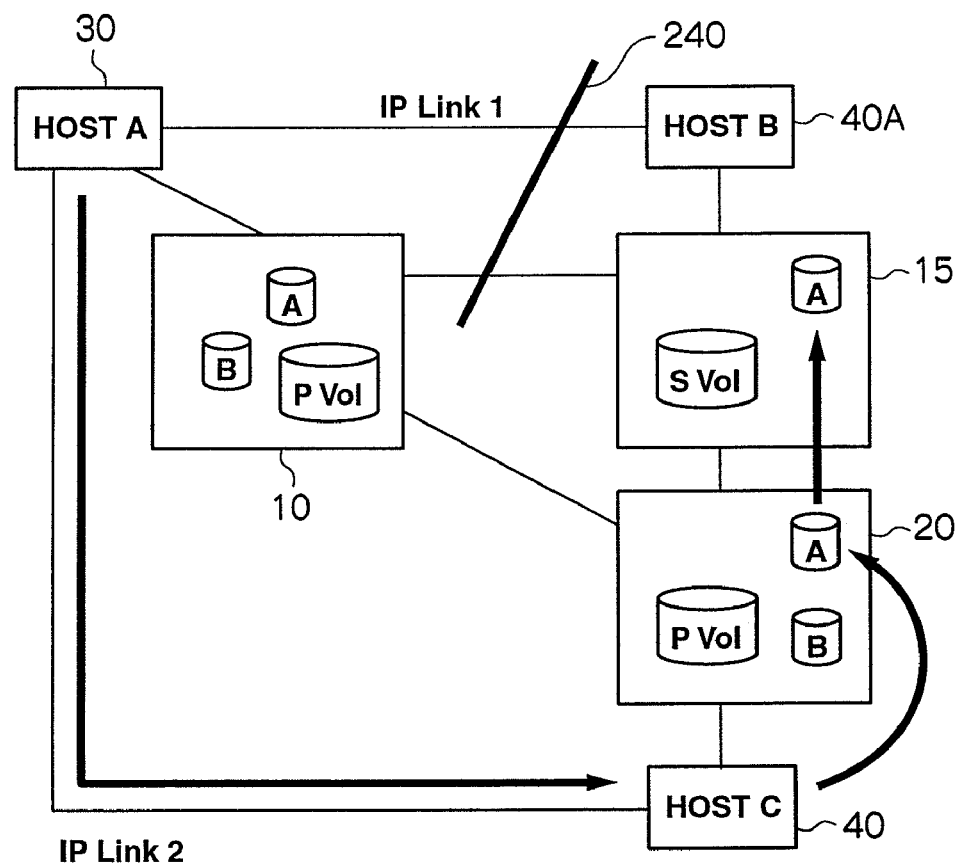
FIG. 26 is a block diagram showing still another process.

If the IP link between the host computer 30 and the host computer 40A and the bus connection between the first and second storage systems 10, 15 are lost as shown in FIG. 24 (S240), a sub volume (S-Vol) in the second storage system 15 needs to be suspended; however, a suspend-requesting command cannot be issued from the host computer 30 or the first storage system 10 to the second storage system 15. In that case, as shown in FIG. 25, the host computer 30 issues a suspend command to the command device B in the third storage system 20 via the virtual volume B' in the first storage system 10 or via the IP link between the host computer 30 and the host computer 40. The third storage system 20 then transmits the relevant control command, which is issued by the command device B therein, to the command device A in the second storage system 15 via its virtual volume A'. The third storage system 20 then sets its own logical volume as a primary logical volume and pairs it with the sub volume in the second storage system 15, thereby resuming the remote copy system.

Figure 27:
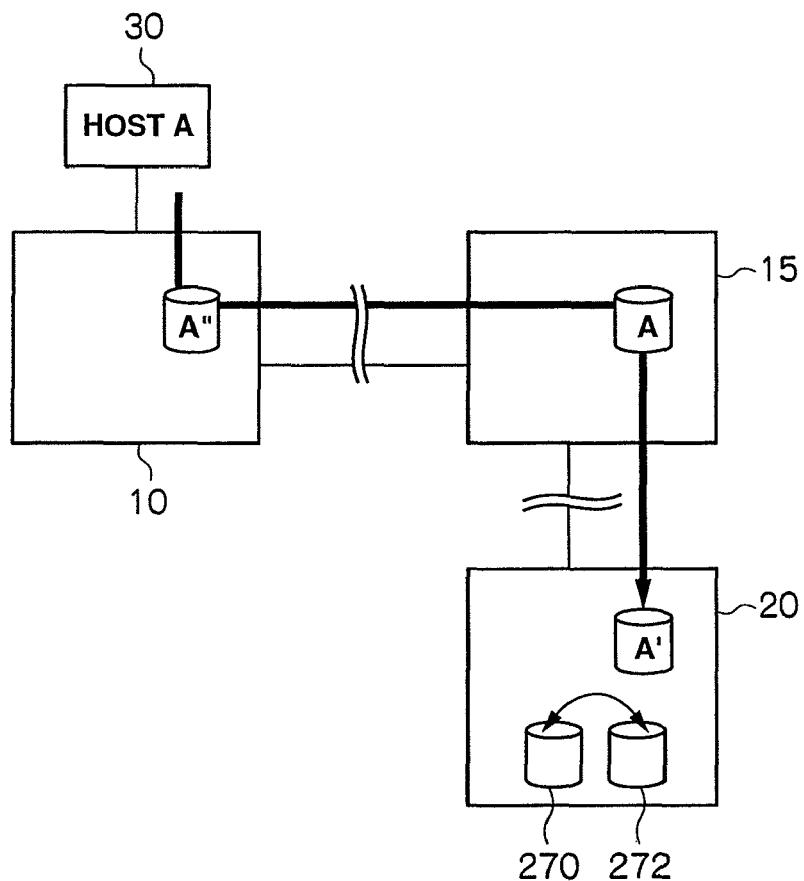
FIG. 27 is a block diagram showing another modified example of FIG. 17.

FIG. 27 shows still another modified example wherein the second storage system 15 has a virtual volume A' mapped onto a virtual volume A" in the first storage system 10. The virtual volume A' in the second storage system 15 is mapped onto a command device A in the third storage system 20. Accordingly, the host computer 30 can issue a control command, such as a command requesting pair setting between data volumes 270 and 272, to the command device A in the third storage system 20 via these virtual volumes. By cascade-connecting the virtual volumes, a host computer can issue a command to an external storage system two or more systems away.

Figure 28:
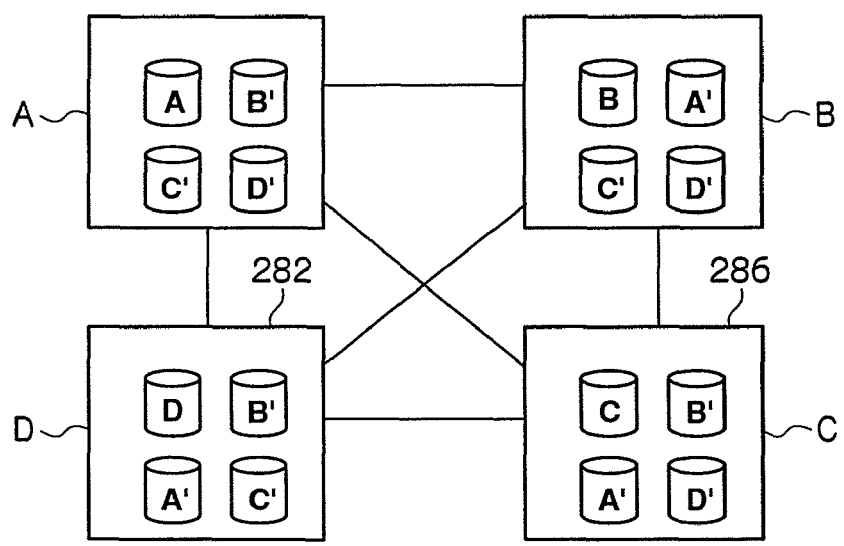
FIG. 28 is a block diagram showing still another modified example.

FIG. 28 illustrates an exemplary configuration wherein a control command can be issued from a storage system to a desired storage system without involving a host computer, by N×M (2×2) bus-connecting a plurality of storage systems A to D one another. Each storage system has virtual volumes mapped onto command devices in separate storage systems respectively. An alphabet letter with an apostrophe attached thereto indicates a virtual volume for a command device identified by the corresponding alphabet letter.

For example, the storage system A has its own command device and virtual volumes corresponding to command devices in each of the other storage systems. When it is assumed that the storage system A is a host system for the storage system C, the CHA controller in the storage system A registers a control command in its command device A. The CHA controller then transmits a control command issued by the command device A to the command device C in the storage system C via the virtual volume C' in the storage system A. The storage system C, as a first storage system, can issue the relevant control command to the command device B in the storage system B, which is a second storage system, or to the command device D in the storage system D, which is a third storage system.

Figures 29, 30:
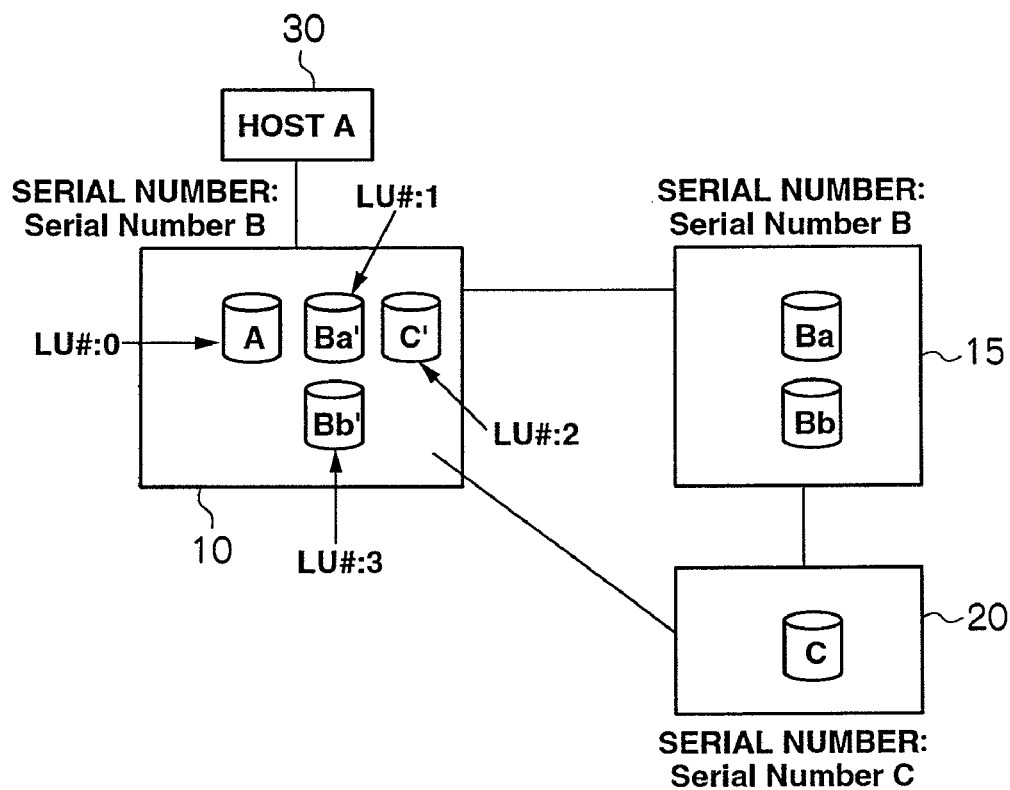
FIG. 29 is a block diagram according to an embodiment where a host computer connected to the first storage controller shows the existence of command devices in external storage controllers to a user.
FIG. 30 is an example of the display on a screen of a host computer or client device connected to the host computer.

An embodiment where the host computer 30 connected to the first storage system 10 shows the user the existence of the command devices in the external storage systems will now be explained. FIG. 29 is a block diagram of the storage control system according to this embodiment and FIG. 30 shows an example of the display on a screen of a host computer or a screen of a client device connected to the host computer. In FIG. 29, A is a command device in the first storage system 10, Ba is a command device in the second storage system 15, and Bb is a data volume in the second storage system 15. C is a command device in the third storage system 20. In the first storage system 10, C' is a virtual volume mapped onto the command device C, Ba' is a virtual volume mapped onto the command device Ba, and Bb' is a virtual volume mapped onto the data volume Bb. Each volume in the first storage system 10 has a LUN (LU#) assigned thereto.

FIG. 30 shows an exemplary image displayed on the screen of the host computer 30 when it executes a command (in the show example, a command 'ioscan' of HP-UX) to check volumes connected to lower systems. Because the volume A (LU#0) is a data volume in the first storage system 10, the serial number of the first storage system 10 is displayed in the field for LU#0. Because the volume Ba' (LU#1) is a virtual volume mapped onto the command device Ba in the second storage system 15, the serial number for the second storage system 15 is displayed in the field for LU#1. Likewise, because the volume C' (LU#2) is a virtual volume mapped onto the command device C in the third storage system 20, the serial number for the third storage system 20 is displayed in the field for LU#2. Because the Bb' (LU#3) is a virtual volume mapped onto the data volume Bb in the second storage system 15, the host computer 30 sees it as its own volume.

In the embodiments explained above, the present invention is applied to a remote copy system where three storage systems are connected to each other, but it may also be applied to a system where two storage systems are connected to each other.

Moreover, other implementations of the invention will be apparent to those skilled in the art from consideration of the specification and practice of the invention disclosed herein. Various aspects and/or components of the described embodiments may be used singly or in any combination in the computerized storage system. It is intended that the specification and examples be considered as exemplary only, with a true scope and spirit of the invention being indicated by the following claims.

What is claimed is:

1. A storage system being adapted to be coupled to a first host system, the storage system comprising:
   a first storage controller connected to the first host system;
   a second storage controller; and
   a third storage controller;
   wherein said first controller, said second controller and said third controller are interconnected with each other; and wherein:
   the first storage controller comprises a first command device and a first volume, the first command device being a destination of a control command issued by the first host system, and the first volume being a destination of write data sent from the first host system and corresponding to a physical storage area managed by the first storage controller;
   the second storage controller comprises a second command device and a second volume as a virtual volume, the second command device being a destination of the control command received via the first command device of the first storage controller, and the second volume being a remote-copy pair with the first volume and a destination of copy data of the write data stored in the first volume; and
   the third storage controller comprises a third command device and a third volume, the third command device being a destination of the control command sent via the second command device as well as the first command device, and the third volume being a remote-copy pair with the second volume and a destination of the copy data stored in the second volume and corresponding to a physical storage area managed by the third storage controller, wherein:
   in a case where a failure of connection between the first storage controller and the second storage controller occurs, the third storage controller:
   issues, in response to a control command regarding suspension received by the third command device via the first command device, a control command to the second command device, and
   changes a status of the third volume to "primary", and perform remote-copy pair between the third volume and the second volume in order to resume operation of the storage system.

2. The storage system according to claim 1, wherein:
   the first host system is operable to transmit an inquiry command to the first storage controller,
   the first storage controller is operable to send first logical device attribute information to the first host system responsive to receiving the inquiry command from the first host system, and
   the first host system is operable to recognize a first logical device in said second storage controller and to issue the control command to the first logical device responsive to receiving first logical device attribute information from the first storage controller.

3. The storage system according to claim 2 further comprising a second host system connected to the second storage controller, the storage system being operable to form a communication path between the second host system and the first host system.

4. The storage system according to claim 3, wherein the first host system is operable to access the second host system via the communication path and to issue the control command to the first logical device.

5. The storage system according to claim 4, wherein the first host system is operable to issue the control command to a first logical device in said second storage controller via a first virtual volume in said first storage controller, responsive to an occurrence of a communication failure in the communication path between the first host system and the second host system.

6. The storage system according to claim 3, the third storage controller comprising a second logical device, wherein the second logical device is operable to receive at least one control command written by a host system selected from the first or the second host systems, and to execute the one control command responsive to the receiving.

7. The storage system according to claim 6, the first storage controller comprising a first virtual volume and a second virtual volume, said second virtual volume being mapped onto the second logical device, wherein the one control command is written by the first host system, and the first storage controller is operable to transmit the one control command, to the second logical device via the second virtual volume.

8. The storage system according to claim 7, the third storage controller comprising a third virtual volume, wherein the third virtual volume is mapped onto the currently amended in the second storage controller and the first host system is operable to issue the one control command to the first logical device in the second storage controller via the second virtual volume and the third virtual volume.

9. The storage system according to claim 5, the second storage controller comprising a second virtual volume mapped onto a logical device in the third storage controller, wherein the second virtual volume is mapped onto the first virtual volume, and the first host system is operable to issue another control command to the first virtual volume that is transmitted to the logical device in the third storage controller via the second virtual volume.

10. A storage system as set forth in claim 1, wherein:
said first volume is located at a first storage site and is connected to the first host system;
said second volume is located at a second storage site having a logical device and the first storage site having a virtual volume mapped onto the logical device;
wherein the second storage site is operable to execute a control command that has been written to the logical device from the first host system; and
the first host system is operable to identify the virtual volume in the first storage site as the logical device in the second storage site, and to display that the logical device belongs to the second storage site.

11. The storage system according to claim 10, the second storage site comprising a plurality of storage controllers, each storage controller comprising a different logical device, wherein the first host system comprises a display that is operable to display the logical device of each storage controller.

* * * * *